United States Patent
Quader et al.

(10) Patent No.: US 11,669,743 B2
(45) Date of Patent: Jun. 6, 2023

(54) ADAPTIVE ACTION RECOGNIZER FOR VIDEO

(71) Applicants: Niamul Quader, Toronto (CA); Juwei Lu, North York (CA); Peng Dai, Markham (CA); Wei Li, Markham (CA)

(72) Inventors: Niamul Quader, Toronto (CA); Juwei Lu, North York (CA); Peng Dai, Markham (CA); Wei Li, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 268 days.

(21) Appl. No.: 16/874,478

(22) Filed: May 14, 2020

(65) Prior Publication Data
US 2020/0366960 A1 Nov. 19, 2020

Related U.S. Application Data

(60) Provisional application No. 62/848,535, filed on May 15, 2019.

(51) Int. Cl.
| | |
|---|---|
| *H04N 21/462* | (2011.01) |
| *G06K 9/62* | (2022.01) |
| *H04N 21/466* | (2011.01) |
| *G06N 3/08* | (2023.01) |
| *G06V 20/40* | (2022.01) |

(Continued)

(52) U.S. Cl.
CPC ....... *H04N 21/4621* (2013.01); *G06F 9/5055* (2013.01); *G06K 9/6277* (2013.01); *G06N 3/0454* (2013.01); *G06N 3/08* (2013.01); *G06V 20/41* (2022.01); *H04N 21/440227* (2013.01);

(Continued)

(58) Field of Classification Search
None
See application file for complete search history.

(56) References Cited

U.S. PATENT DOCUMENTS 8,874,584 B1 * 10/2014 Chen .................. G06F 16/7854
707/741
8,948,271 B2 2/2015 Zhou
(Continued)

FOREIGN PATENT DOCUMENTS

| CN | 104112112 A | 10/2014 |
| CN | 107862376 A | 3/2018 |

(Continued)

OTHER PUBLICATIONS

The 20BN-something-something Dataset V1: The 20BN-something-something Dataset V1, [Accessed Nov. 8, 2019] 2019.

(Continued)

*Primary Examiner* — James R Sheleheda

(57) ABSTRACT

An adaptive action recognizer for video that performs multiscale spatiotemporal decomposition of video to generate lower complexity video. The adaptive action recognizer has a number of processing pathways, one for each level of video complexity with each processing pathway having a different computational cost. The adaptive action recognizer applies a decision making scheme that encourages using low average computational costs while retaining high accuracy.

17 Claims, 13 Drawing Sheets

(51) Int. Cl.
   *G06N 3/04*      (2023.01)
   *H04N 21/4402*   (2011.01)
   *G06F 9/50*      (2006.01)
(52) U.S. Cl.
   CPC ......... *H04N 21/4666* (2013.01); *G06V 20/44* (2022.01)

(56) References Cited

U.S. PATENT DOCUMENTS

| | | | | |
|---|---|---|---|---|
| 9,129,158 | B1* | 9/2015 | Medasani | G06V 20/41 |
| 9,244,924 | B2* | 1/2016 | Cheng | G06F 16/43 |
| 10,185,895 | B1* | 1/2019 | Tse | G06N 3/0445 |
| 10,334,256 | B2* | 6/2019 | Bar-On | H04N 19/184 |
| 10,339,443 | B1* | 7/2019 | Medioni | G06T 15/04 |
| 10,534,966 | B1* | 1/2020 | Tse | G01P 13/00 |
| 10,679,063 | B2* | 6/2020 | Cheng | H04N 21/233 |
| 10,713,493 | B1* | 7/2020 | Huang | G06T 3/0087 |
| 10,776,689 | B2* | 9/2020 | Medioni | G06T 7/40 |
| 2003/0103565 | A1* | 6/2003 | Xie | G06F 16/745 |
| | | | | 375/240.24 |
| 2003/0108334 | A1* | 6/2003 | Nevenka | G06F 16/785 |
| | | | | 386/230 |
| 2007/0055695 | A1* | 3/2007 | Dorai | G06F 16/7834 |
| 2011/0055266 | A1* | 3/2011 | Varadarajan | G06F 16/583 |
| | | | | 707/E17.001 |
| 2011/0109548 | A1* | 5/2011 | Tu | A63F 13/211 |
| | | | | 345/158 |
| 2012/0027304 | A1* | 2/2012 | Brown | G06V 40/103 |
| | | | | 382/190 |
| 2012/0243740 | A1* | 9/2012 | Aragon | G06V 20/41 |
| | | | | 382/199 |
| 2012/0288165 | A1* | 11/2012 | Bedros | G06V 10/993 |
| | | | | 382/118 |
| 2013/0282747 | A1* | 10/2013 | Cheng | G06F 16/783 |
| | | | | 707/758 |
| 2014/0037215 | A1* | 2/2014 | Kumar | G06V 10/46 |
| | | | | 382/197 |
| 2014/0328570 | A1* | 11/2014 | Cheng | H04N 21/233 |
| | | | | 386/241 |
| 2016/0004911 | A1* | 1/2016 | Cheng | G06F 16/43 |
| | | | | 382/159 |
| 2016/0034786 | A1* | 2/2016 | Suri | G06V 20/46 |
| | | | | 382/159 |
| 2017/0076448 | A1* | 3/2017 | Chen | G06V 10/46 |
| 2018/0032845 | A1* | 2/2018 | Polak | G06V 20/41 |
| 2018/0204111 | A1* | 7/2018 | Zadeh | G06K 9/627 |
| 2018/0341706 | A1* | 11/2018 | Agrawal | G06V 20/597 |
| 2019/0045203 | A1* | 2/2019 | Varadarajan | H04N 19/42 |
| 2019/0156157 | A1* | 5/2019 | Saito | G06T 7/70 |
| 2019/0191129 | A1* | 6/2019 | Nakano | H04N 7/183 |
| 2019/0213420 | A1* | 7/2019 | Karyodisa | G06V 10/7788 |
| 2019/0294881 | A1* | 9/2019 | Polak | G06V 20/52 |
| 2020/0057935 | A1* | 2/2020 | Wang | G06N 3/08 |
| 2020/0366960 | A1* | 11/2020 | Quader | G06V 10/82 |
| 2022/0014807 | A1* | 1/2022 | Lin | G06N 3/0445 |

FOREIGN PATENT DOCUMENTS

| | | | |
|---|---|---|---|
| CN | 108491751 A | 9/2018 | |
| CN | 109670380 A | 4/2019 | |
| WO | WO-2020228811 A1 * | 11/2020 | G06F 9/5055 |

OTHER PUBLICATIONS

The 20BN-something-something Dataset V2: The 20BN-something-something Dataset V2, [Accessed Nov. 8, 2019] 2019.

Wang, X., Girshick, R., Gupta, A., He, K.: Non-local neural networks. In: Proceedings of the IEEE Conference on Computer Vision and Pattern Recognition, pp. 7794-7803 2018.

Zhu, X., Xu, C., Hui, L., Lu, C., Tao, D.: Approximated bilinear modules for temporal modeling. In: Proceedings of the IEEE International Conference on Computer Vision. pp. 3494-3503 2019.

Martial Mermillod, Nathalie Guyader, and Alan Chauvin, The coarse-to-fine hypothesis revisited: evidence from neuro-computational modeling, Brain and Cognition, 57(2):151-157, 2005.

Quentin De Smedt, Dynamic hand gesture recognition—From traditional handcrafted to recent deep learning approaches, PhD thesis, Université de Lille 1, Sciences et Technologies; CRIStAL UMR 9189 2017.

Jonathan C Stroud, David A Ross, Chen Sun, Jia Deng, and Rahul Sukthankar. D3d: Distilled 3d networks for video action recognition. arXiv preprint arXiv: 1812.08249, 2018.

Dongliang He, Zhichao Zhou, Chuang Gan, Fu Li, Xiao Liu, Yandong Li, Liming Wang, and Shilei Wen, Stnet: Local and global spatial-temporal modeling for action recognition ,arXiv preprint arXiv:1811.01549 2018.

Mohammadreza Zolfaghari, Kamaljeet Singh, and Thomas Brox, Eco: Efficient convolutional network for online video understanding, In Proceedings of the European Conference on Computer Vision (ECCV), pp. 695-712 2018.

Du Tran, Heng Wang, Lorenzo Torresani, Jamie Ray, Yann LeCun, and Manohar Paluri, A closer look at spatiotemporal convolutions for action recognition, In Proceedings of the IEEE conference on Computer Vision and Pattern Recognition, pp. 6450-6459 2018.

Limin Wang, Yuanjun Xiong, Zhe Wang, Yu Qiao, Dahua Lin, Xiaoou Tang, and Luc Van Gool, Temporal segment networks: Towards good practices for deep action recognition, In European conference on computer vision, pp. 20-36. Springer 2016.

Bolei Zhou, Alex Andonian, Aude Oliva, and Antonio Torralba, Temporal relational reasoning in videos, In Proceedings of the European Conference on Computer Vision (ECCV), pp. 803-818 2018.

Ji Lin, Chuang Gan, and Song Han, Temporal shift module for efficient video understanding, arXiv preprint arXiv:1811.08383 2018.

Joao Carreira and Andrew Zisserman, Quo Vadis, action recognition? a new model and the kinetics dataset, In proceedings of the IEEE Conference on Computer Vision and Pattern Recognition, pp. 6299-6308 2017.

Xiaolong Wang and Abhinav Gupta, Videos as space-time region graphs, In Proceedings of the European Conference on Computer Vision (ECCV), pp. 399-417 2018.

Christoph Feichtenhofer, Axel Pinz, and Richard P Wildes, Spatiotemporal multiplier networks for video action recognition, In Proceedings of the IEEE conference on computer vision and pattern recognition, pp. 4768-4777 2017.

Boston Limited, More power!—Your smartphone is smarter than your games console, [Online]. Available from: https://www.boston.co.uk/blog/2016/09/13/more-power-your-smartphone-is-smarter-than-your-games-console.aspx. [Accessed Apr. 29, 2019]. 2019.

Aaron Carroll, Gernot Heiser, et al., An analysis of power consumption in a smartphone, In USENIX annual technical conference, vol. 14, pp. 21-21. Boston, MA 2010.

Wenjie Luo, Yujia Li, Raquel Urtasun, and Richard Zemel, Understanding the effective receptive field in deep convolutional neural networks, In Advances in neural information processing systems, pp. 4898-4906 2016.

The 20bn-jester dataset v1. The 20BN-jester Dataset V1. [Accessed Apr. 29, 2019] 2019.

Raghav Goyal, Samira Ebrahimi Kahou, Vincent Michalski, Joanna Materzynska, Susanne Westphal, Heuna Kim, Valentin Haenel, Ingo Fruend, Peter Yianilos, Moritz Mueller-Freitag, et al., The"something something" video database for learning and evaluating visual common sense, In ICCV, vol. 1, p. 3 2017.

Karen Simonyan and Andrew Zisserman, Two-stream convolutional networks for action recognition in videos, In Advances in neural information processing systems, pp. 568-576 2014.

Christoph Feichtenhofer, Axel Pinz, and Andrew Zisserman, Convolutional two-stream network fusion for video action recognition, In Proceedings of the IEEE conference on computer vision and pattern recognition, pp. 1933-1941 2016.

Azriel Rosenfeld, Multiresolution image processing and analysis, vol. 12. Springer Science & Business Media 2013.

(56) References Cited

OTHER PUBLICATIONS

Antonio J Rodríguez-Sánchez, Mazyar Fallah, and Aleš Leonardis, Hierarchical object representations in the visual cortex and computer vision. Frontiers in computational neuroscience, 9:142 2015.
Jan J Koenderink, The structure of images, Biological cybernetics, 50(5):363-370 1984.
Jan J Koenderink, Scale-time, Biological Cybernetics, 58(3):159-162 1988.
Paul Viola and Michael J Jones, Robust real-time face detection, International journal of computer vision, 57(2):137-154 2004.
Surat Teerapittayanon, Bradley McDanel, and H. T. Kung. Branchynet, Fast inference via early exiting from deep neural networks, 2016 23rd International Conference on Pattern Recognition (ICPR), pp. 2464-2469 2016.
Xin Wang, Yujia Luo, Daniel Crankshaw, Alexey Tumanov, Fisher Yu, and Joseph E Gonzalez, Idk cascades: Fast deep learning by learning not to overthink, arXiv preprint arXiv:1706.00885 2017.
Okan Kopuklu, Ahmet Gunduz, Neslihan Kose, and Gerhard Rigoil, Real-time hand gesture detection and classification using convolutional neural networks, arXiv preprint arXiv:1901.10323 2019.
Du Tran, Lubomir Bourdev, Rob Fergus, Lorenzo Torresani, and Manohar Paluri, Learning spatiotemporal features with 3d convolutional networks, In Proceedings of the IEEE international conference on computer vision, pp. 4489-4497 2015.
Saining Xie, Chen Sun, Jonathan Huang, Zhuowen Tu, and Kevin Murphy, Rethinking spatiotemporal feature learning: Speed-accuracy trade-offs in video classification, In Proceedings of the European Conference on Computer Vision (ECCV), pp. 305-321 2018.
Kaiming He, Xiangyu Zhang, Shaoqing Ren, and Jian Sun, Identity mappings in deep residual networks, In European conference on computer vision, pp. 630-645. Springer 2016.
Chuan Guo, Geoff Pleiss, Yu Sun, and Kilian Q Weinberger, On calibration of modern neural networks, In Proceedings of the 34th International Conference on Machine Learning—vol. 70, pp. 1321-1330. JMLR. org 2017.
Bichen Wu, Alvin Wan, Xiangyu Yue, Peter Jin, Sicheng Zhao, Noah Golmant, Amir Gholaminejad, Joseph Gonzalez, and Kurt Keutzer, Shift: A zero flop, zero parameter alternative to spatial convolutions, In Proceedings of the IEEE Conference on Computer Vision and Pattern Recognition, pp. 9127-9135 2018.
Kensho Hara, Hirokatsu Kataoka, and Yutaka Satoh, Can spatiotemporal 3d cnns retrace the history of 2d cnns and magenet?, In Proceedings of the IEEE conference on Computer Vision and Pattern Recognition, pp. 6546-6555 2018.
Kaiming He, Xiangyu Zhang, Shaoqing Ren, and Jian Sun, Deep residual learning for image recognition, In Proceedings of the IEEE conference on computer vision and pattern recognition, pp. 770-778 2016.
Jia Deng, Wei Dong, Richard Socher, Li-Jia Li, Kai Li, and Li Fei-Fei, Imagenet: A large scale hierarchical image database, In 2009 IEEE conference on computer vision and pattern recognition, pp. 248-255 2009.
Sergey Ioffe and Christian Szegedy, Batch normalization: Accelerating deep network training by reducing internal covariate shift, arXiv preprint arXiv:1502.03167 2015.
Herbert Robbins and Sutton Monro, A stochastic approximation method, The annals of mathematical statistics, pp. 400-407 1951.
Geoffrey Hinton, Oriol Vinyals, and Jeff Dean, Distilling the knowledge in a neural network, arXiv preprint arXiv:1503.02531 1951.
Okan Kopuklu, Neslihan Kose, and Gerhard Rigoil, Motion fused frames: Data level fusion strategy for hand gesture recognition, In Proceedings of the IEEE Conference on Computer Vision and Pattern Recognition Workshops, pp. 2103-2111 2018.
Green 500 List for Jun. 2016, howpublished =https://www.top500.org/green500/lists/2016/06/, note = Accessed Nov. 8, 2019 2019.
Carreira, J., Noland, E., Hillier, C., Zisserman, A.: A short note on the kinetics-700 human action dataset. arXiv preprint arXiv:1907.06987 2019.
Chen, Y., Fang, H., Xu, B., Yan, Z., Kalantidis, Y., Rohrbach, M., Yan, S., Feng, J.: Drop an octave: Reducing spatial redundancy in convolutional neural networks with octave convolution. arXiv preprint arXiv:1904.05049 2019.
Feichtenhofer, C., Fan, H., Malik, J., He, K.: Slowfast networks for video recognition. In: Proceedings of the IEEE International Conference on Computer Vision. pp. 6202-6211 2019.
Huang, G., Chen, D., Li, T., Wu, F., Van Der Maaten, L., Weinberger, K.Q.: Multi-scale dense convolutional networks for efficient prediction. arXiv preprint arXiv:1703.09844 2 2017.
Jiang, B., Wang, M., Gan, W., Wu, W., Yan, J.: Stm: Spatiotemporal and motion encoding for action recognition. In: Proceedings of the IEEE International Conference on Computer Vision, pp. 2000-2009 2019.
Karpathy, A., Toderici, G., Shetty, S., Leung, T., Sukthankar, R., Fei-Fei, L.: Large-scale video classification with convolutional neural networks. In: Proceedings of the IEEE conference on Computer Vision and Pattern Recognition. pp. 1725-1732 2014.
Lab, M.H.: Tsm: Temporal shift module for efficient video understanding. https://github.com/mit-han-lab/temporal-shift-module 2019.
Luo, C., Yuille, A.L.: Grouped spatial-temporal aggregation for efficient action recognition. In: Proceedings of the IEEE International Conference on Computer Vision, pp. 5512-5521 2019.
Shi, L., Zhang, Y., Hu, J., Cheng, J., Lu, H.: Gesture recognition using spatiotemporal deformable convolutional representation. In: 2019 IEEE International Conference on Image Processing (ICIP). pp. 1900-1904 2019.
Szegedy, C., Vanhoucke, V., Ioffe, S., Shlens, J., Wojna, Z.: Rethinking the inception architecture for computer vision. In: Proceedings of the IEEE conference on computer vision and pattern recognition, pp. 2818-2826 2016.

\* cited by examiner

| Method | Modality | Input Size | Validation | | Test | FLOPs | #Params |
| --- | --- | --- | --- | --- | --- | --- | --- |
| | | | Acc-1(%) | Acc-5(%) | Acc-1(%) | | (BNIception) |
| MFF | RGB, Flow | 256x256x(8x3) | 95.36 | 99.75 | - | - | 24.3M |
| TSM | RGB | 256x256x16 | 96.35 | 99.76 | - | 65G | 24.3M |
| TSN | RGB | 256x256x16 | 84.60 | 99.60 | - | 65G | 24.3M |
| TRN | RGB | 256x256x16 | 95.31 | - | 94.78 | 16G | 18.3M |
| RFEEN-Fine | RGB | 128x128x16 | 96.30 | 99.76 | - | 16.3 | 24.3M |
| RFEEN-mid | RGB | 64x64x8 | 94.37 | 99.65 | - | 2.1G | 24.3M |
| RFEEN-coarse | RGB | 32x32x8 | 89.60 | 98.95 | - | 0.5G | 24.3M |
| RFEEN-En | RGB | 128x128x16 | 96.48 | 99.72 | - | 18.9G | 73M |
| RFEEN-En-exit | RGB | 128x128x16 | 96.45 | - | - | 8.9G | 73M |

FIG. 12

ADAPTIVE ACTION RECOGNIZER FOR VIDEO

RELATED APPLICATION DATA

The present application claims priority to U.S. patent application No. 62/848,535, filed May 15, 2019, the content of which is incorporated herein by reference.

TECHNICAL FIELD

The present application relates generally to video analysis and, more specifically, to an adaptive action recognizer for video.

BACKGROUND

Automatic recognition of action in videos is important to many digital video applications in robotics, manufacturing, industry and human machine interface (HMI) applications involving action recognition. However, existing solutions are resource intensive and may not be suitable for constrained resource scenarios. Accordingly, there exists a need for solutions to automatic action recognition in videos which are more efficient.

BRIEF DESCRIPTION OF THE DRAWINGS

FIG. 12 illustrates a table comparing the performance of various implementations of the adaptive action recognizer of the present application with state-of-the-art methods on a known dataset.

SUMMARY

Figure 1:
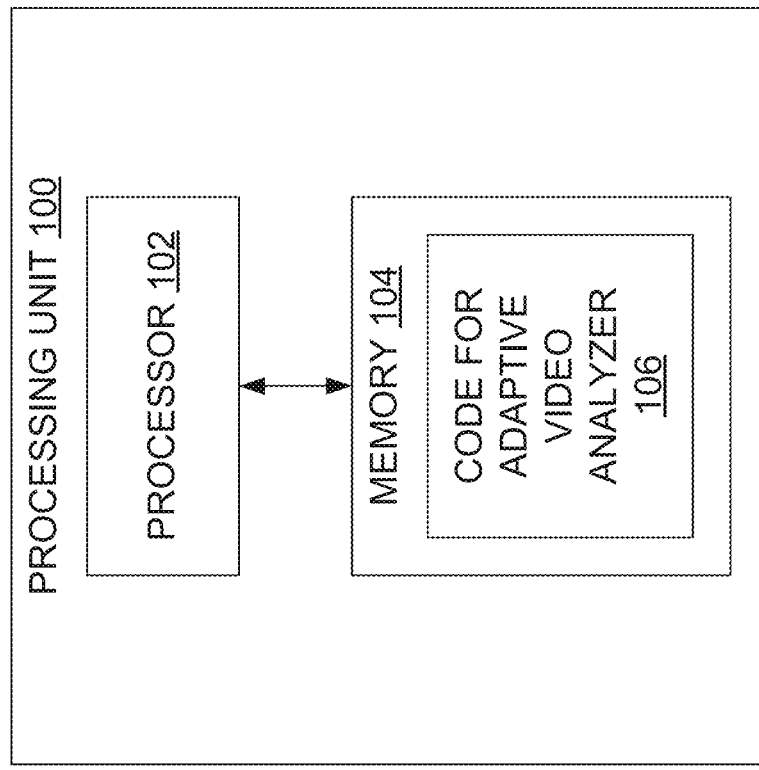
FIG. 1 illustrates a processing unit suitable for practicing the teachings of the present application.

The present application provides an adaptive action recognizer for video that performs multiscale spatiotemporal decomposition of video to generate lower complexity video. The adaptive action recognizer has a number of processing pathways, one for each level of video complexity with each processing pathway having a different computational cost. The adaptive action recognizer applies a decision making scheme that encourages using low average computational costs while retaining high accuracy.

The adaptive action recognizer may be implemented using a neural network. The processing pathways may comprise a coarse pathway (C), a medium (or medium fine or finer) pathway (M) and a fine (or finest) processing pathway, thereby providing processing pathways for different levels of video complexity from coarse to fine (C2F). Video complexity may vary based on resolution and/or frame rate. Thus, the neural network may be considered a multi-resolution or multi-complexity network. Each processing pathway comprises a deep convolutional neural network (CNN) that performs action recognition on video. Depending on the pathway, the pathway may also comprise a video decomposition module for spatial and/or temporal decomposition and a feature fusion module. A decision making scheme for action recognition encourages action recognition using coarser processing pathways having low average computational costs during inference and using finer processing pathways having higher average computational costs in a data dependent fashion to retain accuracy while reducing computational cost.

The generation of coarser videos and use of deep CNNs trained for action recognition on such coarser videos allows the generation of activation maps with large effective receptive fields in the deep CNNs of the coarse resolution pathways to complement high resolution activation maps with smaller effective receptive fields in the finer resolution pathways. The pathways may be combined in an ensemble, which may be implemented as a relatively simple yet effective end-to-end learnable ensemble that combines the processing pathways. The decision making scheme guides the network to move to finer and more computationally intensive pathways only when needed.

The adaptive action recognizer can operate at varying computation cost budgets. A controller can be provide to a control scheme that controls a coarse-exit hyperparameter used to determine the processing pathway used by the adaptive action recognizer so that the adaptive action recognizer operates at a budget computational cost assigned externally by a device or system using the adaptive action recognizer. A separate moving average-based prediction approach may be used to estimate a level of complexity of videos that the adaptive action recognizer is likely to process, uses a regression predictor to predict an optimal value of the coarse-exit hyperparameter, and continually assign the optimal coarse-exit hyperparameter in the adaptive action recognizer so that the adaptive action recognizer the adaptive action recognizer operates at close to the input budget computational cost. The control scheme may be used in single device or extended for use with a group of multiple devices, such as in a multiple Internet-of-Things (IoT) connected device environment such as where a mobile phone, a laptop and a TV all connected, and the computations required in the TV are partially done in the laptop and the mobile phone and sent back to the TV. This provides a control system to operating the adaptive action recognizer across multiple devices.

In accordance with a first embodiment of a first aspect of the present application, there is provided a method of action recognition in video. A high complexity video is processed to generate a medium complexity video and a low complexity video. A first action recognizer processes the low complexity video to recognize actions in the low complexity video. A second action recognizer processes the medium complexity video to recognize actions in the medium complexity video in response to a determination that a probability associated with a highest probability action recognized by the first action recognizer is below a threshold. A third action recognizer processes the high complexity video to recognize actions in the high complexity video in response to a determination that a probability associated with a highest probability action recognized by the second action recognizer is below the threshold.

In some or all examples of the first embodiment of the first aspect, each of the first action recognizer, second action recognizer and third action recognizer predict a set of probabilities, one probability associated with each action in a class of actions.

In some or all examples of the first embodiment of the first aspect, the method further comprises: in response to the determination that the probability associated with the highest probability action recognized by the second action recognizer is below the threshold: combining the set of probabilities output by the first action recognizer, second action recognizer and third action recognizer to generate an ensemble set of probabilities; and outputting the highest probability action in the ensemble set of probabilities in response to a determination that the probability associated with the highest probability action in the ensemble set of probabilities is equal to or greater than the threshold.

In some or all examples of the first embodiment of the first aspect, the first action recognizer, second action recognizer and third action recognizer each comprise a deep convolutional neural network (CNN) comprising multiple fully connected layers, and wherein combining the set of probabilities output by the first action recognizer, second action recognizer and third action recognizer to generate an ensemble set of probabilities comprises: concatenating the set of probabilities output by the first action recognizer, second action recognizer and third action recognizer; and generating by a re-parameterized fully connected layer the ensemble set of probabilities from the concatenated set of probabilities.

In some or all examples of the first embodiment of the first aspect, the method further comprises: outputting the set of probabilities recognized by the first action recognizer in response to a determination that the probability of the highest probability action recognized by the first action recognizer is equal to or greater than the threshold; and outputting the set of probabilities recognized by the second action recognizer in response to a determination that the probability of the highest probability action recognized by the second action recognizer is equal to or greater than the threshold.

In some or all examples of the first embodiment of the first aspect, the threshold is a hyperparameter T based on a budget computational resource B.

In some or all examples of the first embodiment of the first aspect, the hyperparameter T is optimized as follows in accordance with the following equation:

$$T = T_{av} + (B - f_{av}) * \frac{f_{av} - f_{C2F}}{T_{av} - 1.0}$$

where $B \in \mathbb{R} : B \in [f_C, f_{C2F}]$, $f_C$ is an actual computational cost to generate the set of probabilities by the first action recognizer for a single recognition, $f_{C2F}$ is the actual computational cost to generate the ensemble set of probabilities for a single recognition, $f_{av}$ is a running average computational resource and $T_{av}$ is the average of previous recognitions for r recognitions.

In some or all examples of the first embodiment of the first aspect, each of the first action recognizer, second action recognizer and third action recognizer are configured to recognize a class of actions in video, wherein the first action recognizer, second action recognizer and third action recognizer are configured to recognize the class of actions in video at a low level of video complexity, medium level of video complexity, and a high level of video complexity, respectively.

In some or all examples of the first embodiment of the first aspect, the wherein the threshold is a hyperparameter T based on a budget computational resource, B, wherein the budget computational resource is based on an available computational resource of a group of devices which jointly perform the method, wherein a device is included in the group of devices and its available computational resource is included in the budget computational resource in response to a determination the available computational resource of the respective device is equal to or greater than a computational cost of the first action recognizer.

In some or all examples of the first embodiment of the first aspect, the first action recognizer, second action recognizer and third action recognizer each comprise a deep convolutional neural network (CNN).

In some or all examples of the first embodiment of the first aspect, the high complexity video is spatiotemporally decomposed to generate the medium complexity video and low complexity video.

In some or all examples of the first embodiment of the first aspect, the spatiotemporally decomposition comprises downsampling the high complexity video to generate the medium complexity video and low complexity video having both a lower resolution video and lower frame rate.

In some or all examples of the first embodiment of the first aspect, the downsampling comprises downsizing the high complexity video by a factor of two using a bilinear interpolation technique to generate the medium complexity video, and downsizing the medium complexity video by a factor of two using the bilinear interpolation technique to generate the low complexity video.

In some or all examples of the first embodiment of the first aspect, the high complexity video has a resolution of width (W) pixels×height (H) pixels and a frame rate of X in frames per second (FPS), the medium complexity video has a resolution of W/2 pixels×H/2 pixels and a frame rate of X/2 FPS, and the medium complexity video has a resolution of W/4 pixels×H/4 pixels and a frame rate of X/4 FPS.

In accordance with a second embodiment of the first aspect of the present application, there is provided a method of analyzing a video to recognize a action in the video, such as a gesture. The method includes receiving the video, processing the video to generate a coarse video and processing the video to generate a finest video. The method further includes recognizing an action, such as a gesture, using a first action recognizer in the coarse video, determining a first level of confidence that the first action recognizer has recognized a action and, responsive to the determining that the first level of confidence does not surpass a threshold, recognizing a action in the finest video using a finest action recognizer. The method also includes determining a second level of confidence that the finest action recognizer has recognized a action and responsive to the determining that the second level of confidence surpasses the threshold, providing an indication of the action.

In some or all examples of the second embodiment of the first aspect, the first action recognizer includes a first neural network comprising multiple fully connected layers. In some or all examples, the first neural network comprises a deep convolutional neural network.

In some or all examples of the second embodiment of the first aspect, the coarse video comprises a relatively low-resolution video, wherein the relatively low-resolution video comprises frames having 32 pixel by 32 pixel or less.

In some or all examples of the second embodiment of the first aspect, the coarse video comprises a relatively low-frame-per-second video, wherein the relatively low-frame-per-second video comprises eight frame-per-second or less.

In some or all examples of the second embodiment of the first aspect, the finer video comprises a relatively higher resolution video, wherein the relatively higher resolution video comprises frames having 64 pixel by 64 pixel or less.

In some or all examples of the second embodiment of the first aspect, the finer video comprises a relatively higher frame-per-second video wherein the finer video comprises a relatively higher frame-per-second video comprises 16 frame-per-second video.

In accordance with a further aspect of the present application, there is a computing device having a processing system comprising at least one processor and a memory. The memory has tangibly stored thereon executable instructions. The executable instructions, in response to execution by the processing system, cause the computing device to perform the methods described above and herein.

In accordance with a further aspect of the present application, there is provided a non-transitory machine readable medium having tangibly stored thereon executable instructions for execution by a processor system of a computing device. The processing system comprises at least one processor. The executable instructions, in response to execution by the processor system, cause the processor system to perform the methods described above and herein.

In accordance with a further aspect of the present application, there is provided an adaptive action recognizer. The adaptive action recognizer comprises a video decomposer configured to process a high complexity video to generate a medium complexity video and a low complexity video, a first action recognizer configured to process the low complexity video to recognize actions in the low complexity video, a second action recognizer configured to process the medium complexity video to recognize actions in the medium complexity video in response to a determination that a probability associated with a highest probability action recognized by the first action recognizer is below a threshold, and a third action recognizer configured to process the high complexity video to recognize actions in the high complexity video in response to a determination that a probability associated with a highest probability action recognized by the second action recognizer is below the threshold.

In some or all examples of the adaptive action recognizer, each of the first action recognizer, second action recognizer and third action recognizer predict a set of probabilities, one probability associated with each action in a class of actions.

In some or all examples of the adaptive action recognizer, the adaptive action recognizer further comprises: a controller configured to output the highest probability action recognized by one of the first, second or third action recognizer in response to a determination that the probability associated with the highest probability action recognized by the respective one of the first, second or third action recognizer is equal to or greater than the threshold.

In some or all examples of the adaptive action recognizer, the high complexity video is spatiotemporally decomposed to generate the medium complexity video and low complexity video.

In some or all examples of the adaptive action recognizer, the first action recognizer, second action recognizer and third action recognizer each comprise a deep convolutional neural network (CNN).

Other aspects and features of the present application will become apparent to those of ordinary skill in the art upon review of the following description of specific implementations of the application in conjunction with the accompanying figures.

DESCRIPTION OF EXAMPLE EMBODIMENTS

The present application is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

The terms "gesture" and "action" are used throughout the present disclosure. A gesture is a subclass of actions. An action may be a gesture and all gestures are actions. A gesture is an action performed by a person used for the purpose of communication, for example, for the purpose of communication with an HMI. Gestures are performed using human body parts such as a hand, head, leg, foot, etc. Examples of a gesture include a hand with a thumb pointing up and a nodding of the head. An action need not be performed by a person and need not be performed for the purpose of communication. Examples of an action include walking, pouring a glass of liquid, riding a bike, driving a vehicle, etc.

Figure 2:
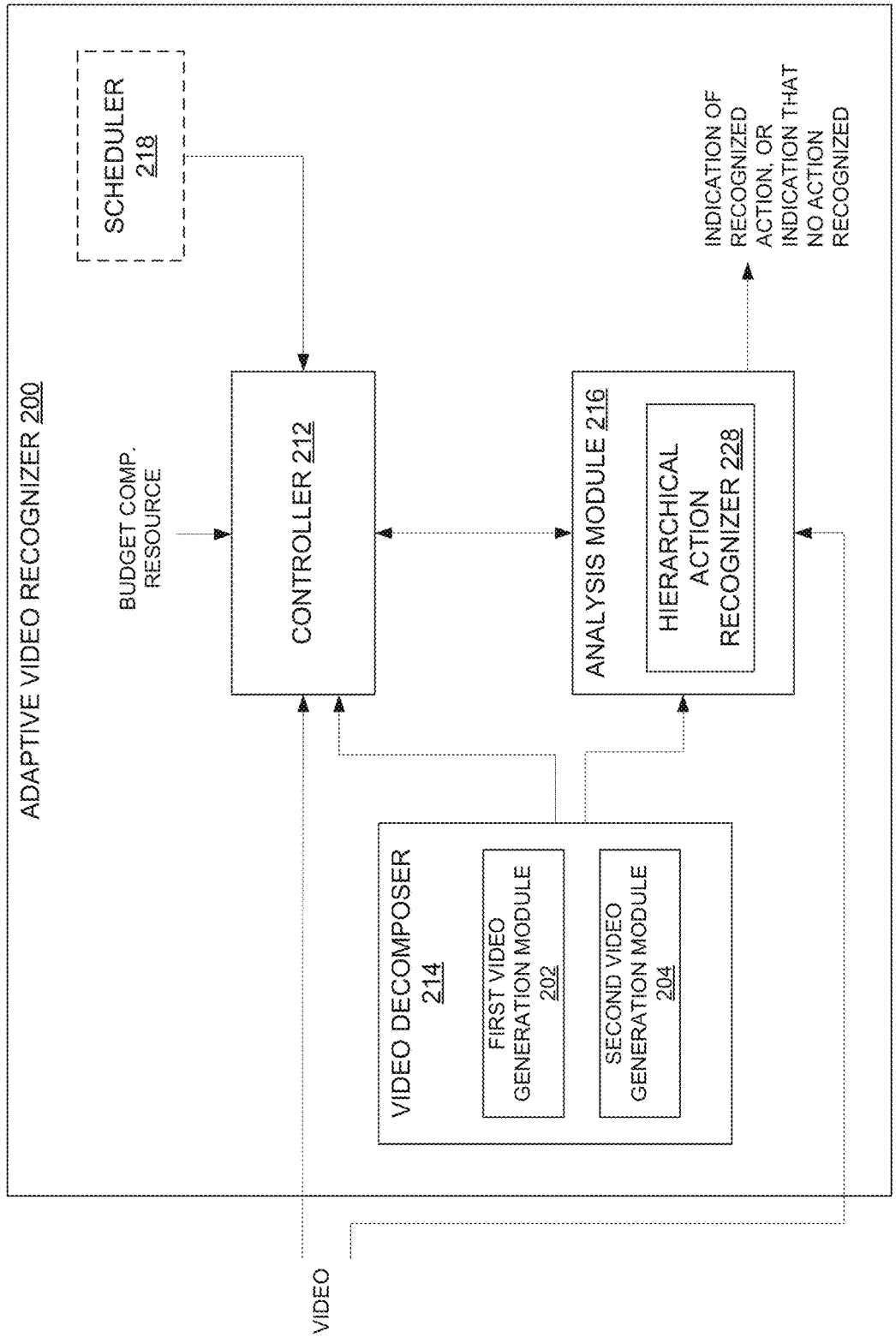
FIG. 2 illustrates an adaptive action recognizer with an analysis module in accordance with embodiments of the present application.

FIG. 1 illustrates a processing unit 100 suitable for practicing the teachings of the present application. The processing unit 100 includes a processor system comprising at least one processor 102 that interacts with a memory 104. The memory 104 stores received video to be analyzed and code 106 for an adaptive action recognizer 200 (FIG. 2). It will be understood that the video to be analyzed may have been previously received and stored in the memory 104 for later processing. Alternatively, the video to be analyzed may be received as it is being processed so that the processing of the video occurs in real-time.

The processing unit 100 is embodied in a host computing device. Examples of the host computing device included, but are not limited to, a security camera or security video system, a line scan camera, a personal camera or camera peripheral, a smartphone, tablet, a personal computer such as a desktop or laptop computer, smart glasses or other head device mounted smart display, a smart speaker, a robot, or an unmanned aerial vehicle (UAV) among other possibilities.

FIG. 2 illustrates an implementation of an adaptive action recognizer 200 that is realized responsive to the processor 102 executing the code 106. The adaptive action recognizer 200 has a plurality of processing pathways which vary in terms of the video complexity processed by each pathway. Video complexity may vary in terms of image resolution, frame rate, or both. Video received by the adaptive action recognizer 200 may be spatially and/or temporally decomposed from an initial high resolution and an initial high (or normal) frame rate to one or more lower complexity videos having a lower resolution and/or lower frame rate. For each level of video complexity, there is provided a dedicated action recognizer trained to recognize actions at the corresponding level of video complexity.

The adaptive action recognizer 200 includes a controller 212, a video decomposer 214, and an analysis software module 216 that includes a hierarchical action recognizer 228. Alternatively, the controller 212 may be considered distinct from, but coupled to, the adaptive action recognizer 200. The adaptive action recognizer 200 may also comprise a scheduler 218. The video decomposer 214 receives input video such as video in RGB (red, green, and blue) format. The video decomposer 214 comprises a number of video generation modules configured to generate videos of various levels of video complexity based on the input video. As noted above, video complexity may vary in terms of image resolution, frame rate, or both. The number of video generation modules and the number of levels of video complexity may vary. Each of the video generation modules performs downsizing (i.e., downsampling) to generate a video having a lower resolution video and/or lower frame rate. The downsampling operation is be performed by downsizing the input video by a scaling factor using a bilinear interpolation technique or other suitable technique. The downsampling operation may be repeated n−1 times to get a total of n videos of different resolutions. Each of the video generation modules starts with the input video or the output of another video generation module.

In the shown embodiment of FIG. 2, the video decomposer 214 has two (2) video generation modules for spatiotemporal decomposing the original input video and generating downsampled videos of 2 levels of video complexity. A first video generation module 202 is configured to generate a medium resolution, medium frames per second (FPS) video based on the original input video. An example of a medium resolution video is a video comprising frames having a resolution of W/2 pixels×H/2 pixels, wherein W×H is the width (W) and height (H) in pixels of the original input video. An example of a medium FPS video is a video having a frame rate of X/2, wherein X is the frame rate of the original input video in FPS. A second video generation module 204 is configured to generate a low resolution, low FPS video based on the original input video. An example of a low resolution video is a video comprising frames having a resolution of W/4 pixels×H/4 pixels, wherein W×H is the resolution in pixels of the original input video. An example of a low FPS video is a video having a frame rate of X/4, wherein X is the frame rate of the original input video in FPS.

Each of the video generation modules 202 and 204 perform downsampling to generate a video having both a lower resolution video and lower frame rate. The downsampling operation is performed by downsizing the input video by a factor of two using a bilinear interpolation technique. The video generation module 202 and 204 may be operated in series with the output of the first video generation module 202 providing the input to the second video generation module 204 so that the high resolution and high frame rate input video is progressively downsampled to generate lower complexity videos having a lower resolution and lower frame rate.

More than two video generation modules may be provided in other embodiments. For example, in another embodiment there may be five video generation modules. A third video generation module may be configured to generate a medium resolution, low FPS video. A fourth video generation module may be configured to generate a medium resolution, normal FPS video based on the received video. A fifth video generation module may be configured to generate a high resolution (i.e., original or initial resolution), low FPS video based on the received video. Similar to above, the video generation modules may be operated in series with the output of one video generation module providing the input to another video generation module so that the high resolution and high frame rate input video is progressively downsampled to generate lower complexity videos having a lower resolution and/or lower frame rate.

Figure 3:
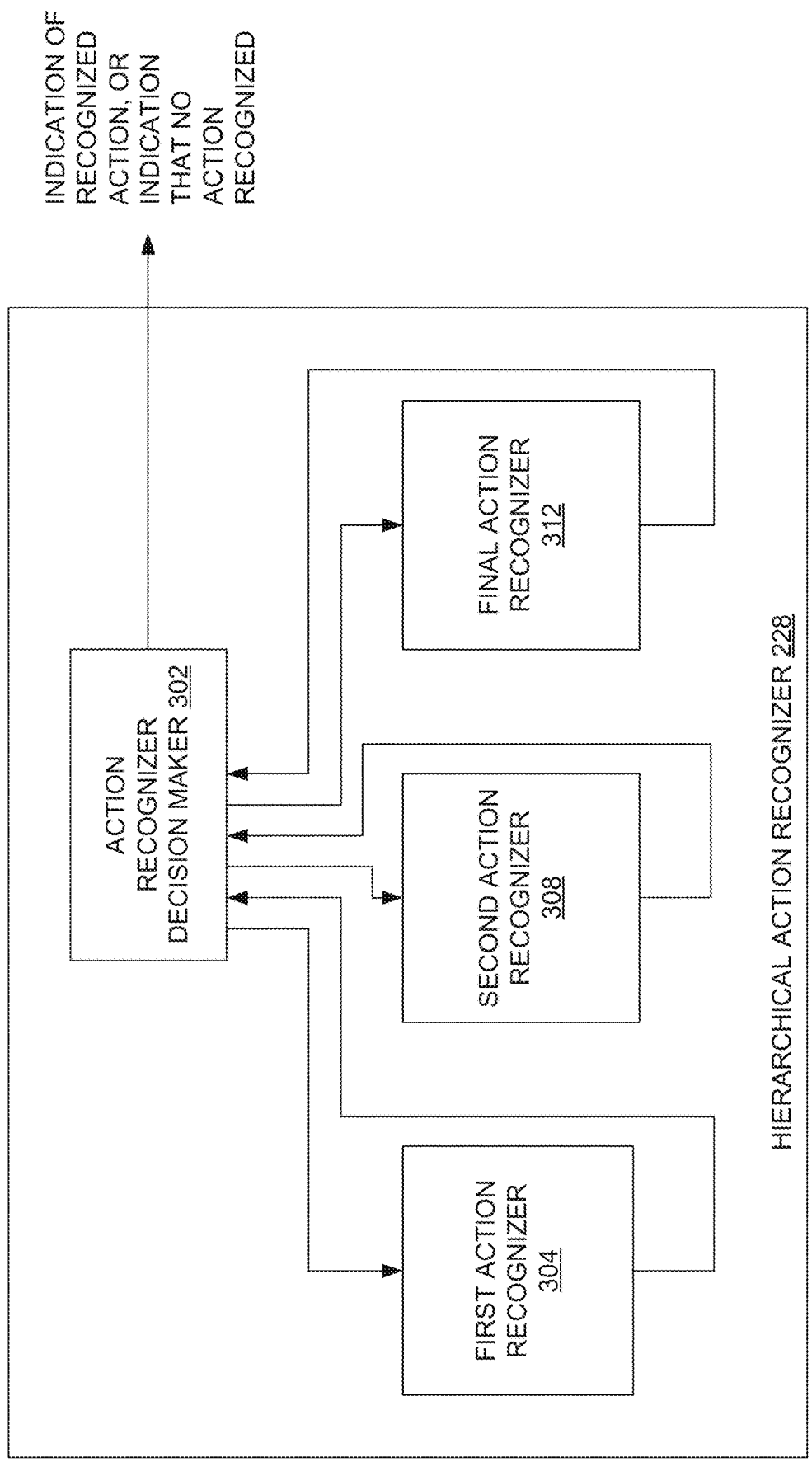
FIG. 3 illustrates a hierarchical action recognizer of the analysis module of FIG. 2 in accordance with embodiments of the present application.

FIG. 3 illustrates the hierarchical action recognizer 228 of the analysis module 216 of FIG. 2 in greater detail. The hierarchical action recognizer 228 comprises an action recognizer decision maker 302 and is configured to access the input video and the decomposed videos generated by the video decomposer 214 having a lower complexity in terms of a lower resolution and/or lower frame rate receive a video from the controller 212. The hierarchical action recognizer 228 selectively access the input video and the decomposed videos generated as required. Alternatively, the controller 212 may be configured to have access to the input video and the decomposed videos generated by the video decomposer 214 and selectively provide video to the hierarchical action recognizer 228 as required.

The action recognizer decision maker 302 may be connected to provide the received video to a selected action recognizer among a plurality of action recognizers. An action recognizer is provided for each video generation module and each level of video complexity. In the shown embodiment, the plurality of action recognizers comprise a first action recognizer 304, a second action recognizer 308, and a final action recognizer 312. The action recognizers may be implemented a neural network such as a deep convolutional neural network (CNN). The action recognizer decision maker 302 is configured to receive a probability value for each action in a class of actions or a highest probability value and a class of the action having the highest probability value, and to output an indication of an action based on the action with the highest probability value. As noted above, the class of actions may comprise or consists of gestures such as a hand swiping left-to-right, a hand swiping right-to-left, a thumb up and hand turning counterclockwise. Thus, the indication of an action may be an indication of one of these gestures.

Figure 4:
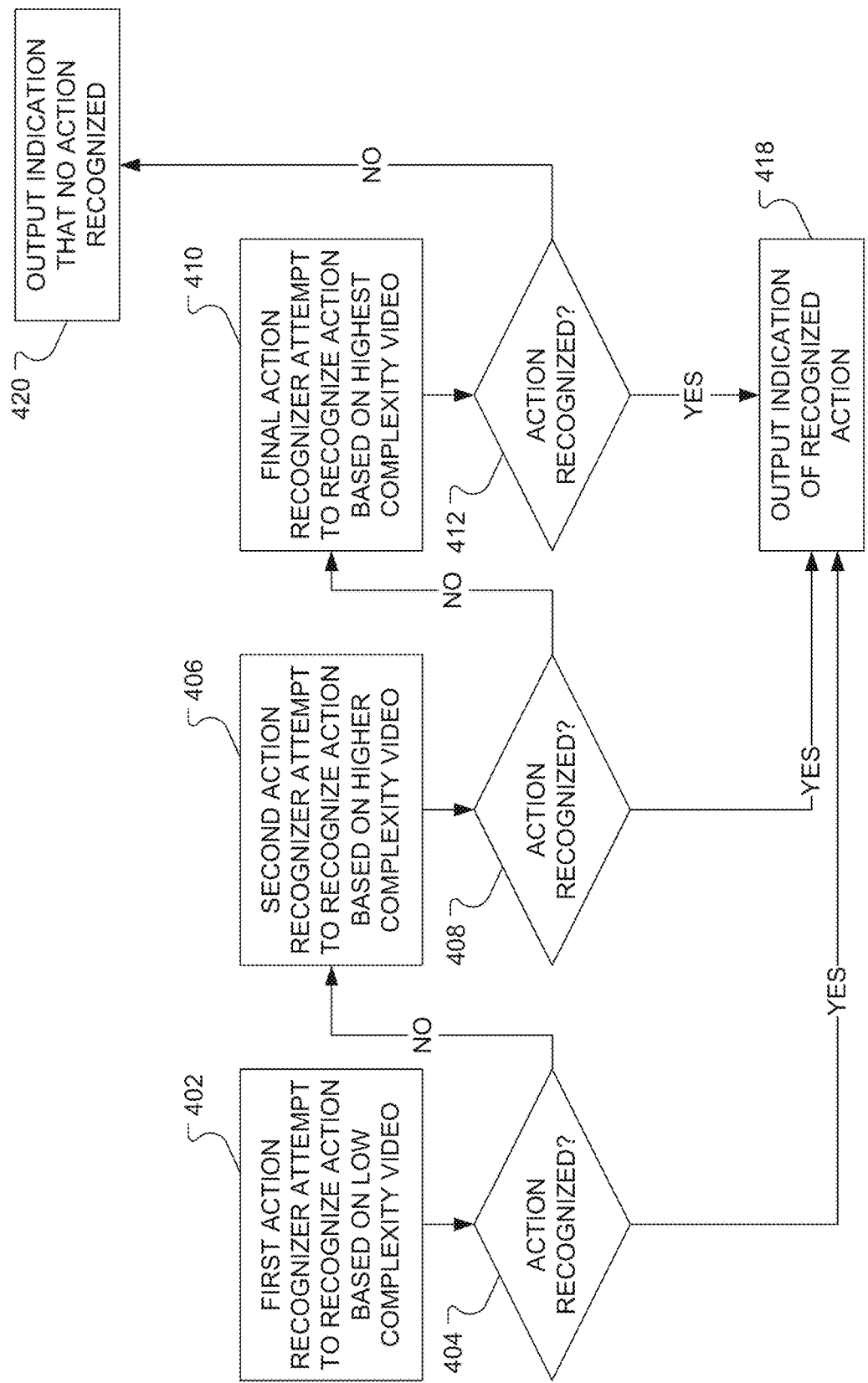
FIG. 4 illustrates a method of action recognition using the adaptive action recognizer of FIG. 2 in accordance with one embodiment of the present application.

FIG. 4 illustrates a method of automated action recognition performed by the analysis module 216 of the adaptive action recognizer 200 of FIG. 2 in accordance with one embodiment of the present application. At operation 402, the first action recognizer 304 receives a low complexity video such as a low resolution, low FPS video by the first video generation module 204 and attempts to recognize an action, such as a gesture. The first action recognizer 304 produces a probability value, p, for a highest probability action. The probability value, p, is provided by the first action recognizer 304 to the action recognizer decision maker 302.

At operation 404, the action recognizer decision maker 302 determines whether an action has been recognized by the first action recognizer 304 by determining whether the probability value, p, produced by the first action recognizer 304 is equal to or greater than a threshold, T. As described more fully below, the threshold T may be controllable, for example, by the controller 212. In response to a determination that an action has been recognized by the first action recognizer 304, at operation 418 the action recognizer decision maker 302 outputs an indication of the recognized action. The indication of the recognized action may be used by the host computing device in further processing, for example, as a part of HMI processing logic.

In response to a determination that an action has not been recognized by the first action recognizer 304 (i.e., that the probability value, p, output from the first action recognizer 304 is not equal to or greater than the threshold, T), at action 406 the second action recognizer 306 receives a higher complexity video such as a medium resolution, medium FPS video by the second video generation module 204 and attempts to recognize an action, such as a gesture. The second action recognizer 306 produces a probability value, p, for a highest probability action. The probability value, p, is provided by the second action recognizer 306 to the action recognizer decision maker 302.

At operation 408, the action recognizer decision maker 302 determines whether an action has been recognized by the second action recognizer 306 by determining whether the probability value, p, produced by the second action recognizer 306 is equal to or greater than the threshold, T. In response to a determination that an action has been recognized by the second action recognizer 306, at operation 418 the action recognizer decision maker 302 outputs an indication of the recognized action.

In response to a determination that an action has not been recognized by the second action recognizer 306 (i.e., that the probability value, p, output from the second action recognizer 306 is not equal to or greater than the threshold, T), at action 410 the final action recognizer 308 receives a yet higher complexity video such as a medium the input video at a high resolution, high FPS and attempts to recognize an action, such as a gesture. The final action recognizer 308 produces a probability value, p, for a highest probability action. The probability value, p, is provided by the final action recognizer 308 to the action recognizer decision maker 302.

At operation 412, the action recognizer decision maker 302 determines whether an action has been recognized by the final action recognizer 308 determining whether the probability value, p, produced by the final action recognizer 308 is equal to or greater than the threshold, T. In response to a determination that an action has been recognized by the final action recognizer 308, at operation 418 the action recognizer decision maker 302 outputs an indication of the recognized action.

In response to a determination that an action has not been recognized by the final action recognizer 308 (i.e., that the probability value, p, output from the final action recognizer 308 is not equal to or greater than the threshold, T), at operation 420 the action recognizer decision maker 302 outputs an indication that no action has been recognized. The indication that no action has been recognized may be used by the host computing device in further processing, for example, as a part of HMI processing logic.

More than three action recognizers may be provided in other embodiments. In such embodiments, there are more than one intermediate action recognizer, each processing video of increasing video complexity between as processing moves between the first action recognizer 302 which processes low resolution, low FPS video and the final action recognizer 308 which processes the input video at high resolution, high FPS.

The action recognizers 304, 308, 312 are all trained together using the same video at differing levels of video complexity. The videos of differing video complexity are separately input to the respective action recognizers 304, 308, 312. A low complexity video is input into the first action recognizer 304, a medium complexity video is input into the second action recognizer 308 and a high complexity video is input into the third action recognizer 312. For each action recognizer, forward propagation generates an output and a loss is computed by comparing this output with the true class of the action in the video. The losses obtained are all backpropagated, or traced back, through the action recognizers 304, 308, 312, for example to various layers of associated neural networks. Backpropagation of the losses is used along with a stochastic gradient descent algorithm to update parameters in each neural network. The losses of all action recognizers may be accumulated in a multi-loss function which may be optimized during training.

Figure 5A:
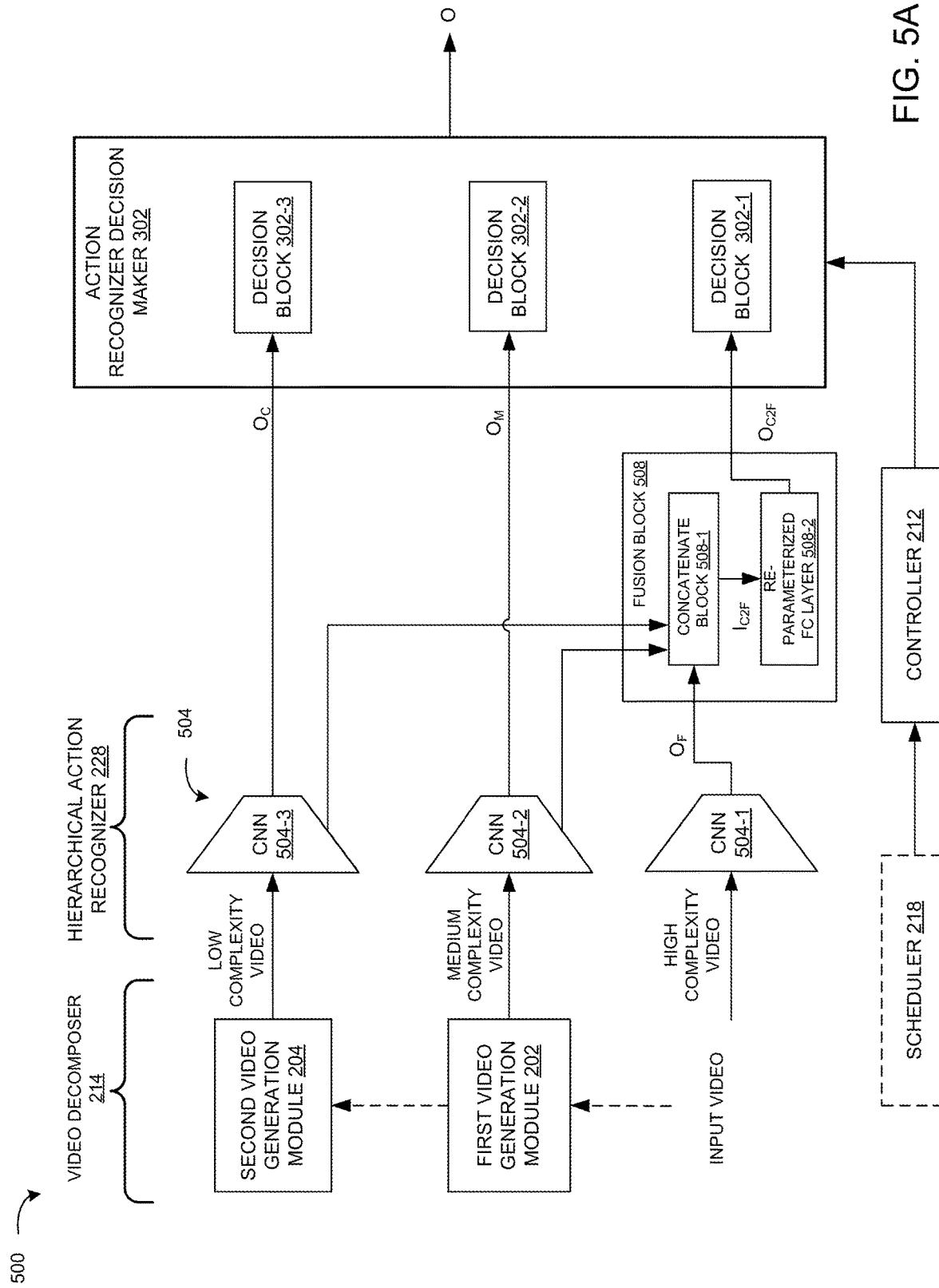
FIG. 5A illustrates a receptive field enhancing ensemble network for implementing the adaptive action recognizer of FIG. 2 in accordance with one embodiment of the present application.

FIG. 5A illustrates a receptive field enhancing ensemble network (RFEEN) 500 for implementing the adaptive action recognizer of FIG. 2 in accordance with one embodiment of the present application. The RFEEN 500 comprises the video decomposer 214 which downsamples input video into one or both of the spatial and temporal domains. In the shown embodiment, the video decomposer 214 performs both spatial and temporal decomposition, also known as spatiotemporal decomposition, in 2 stages to produce a video of medium and low complexity based on input video having high complexity. In the shown example, the input video has an image resolution of W (pixels)×H (pixels), and a frame rate of X (FPS). The medium complexity video has an image resolution of W/2 pixels×H/2 pixels and a frame rate of X/2 FPS. The low complexity video has an image resolution of W/4 pixels×H/4 pixels and a frame rate of X/4 FPS.

The video decomposer 214 performs downsampling to generate video having both a lower resolution video and lower frame rate in some examples. The downsampling operation is performed by downsizing the input video by a factor of two using a bilinear interpolation technique. The downsampling operation is repeated n−1 times to get a total of n levels of video complexity. The video generation modules 202 and 204 may be operated in series with the output of the first video generation module 202 providing the input to the second video generation module 204 so that the high resolution and high frame rate input video is progressively downsampled to generate lower complexity videos having a lower resolution and lower frame rate.

The RFEEN 500 comprises a number of deep CNNs, referred to collectively by reference numeral 504, which implement the hierarchical action recognizer 228. The RFEEN 500 comprises one deep CNN for each level of video complexity processed by the RFEEN 500, with each deep CNN being connected to and receiving as input a source of video at the corresponding level of video complexity. Each CNN has multiple fully connected layers and is trained for action recognition in videos at the corresponding level of video complexity. The deep CNNs may be any deep CNN configured to operate on video with different video complexity, for example either dense sampling or light sampling (e.g., strided sampling) and recognize actions such as gestures. An example of a suitable CNN architecture is the temporal shift module (TSM) described in Ji Lin, Chuang Gan, and Song Han, Temporal shift module for efficient video understanding, arXiv preprint arXiv: 1811.08383, 2018, incorporated herein by reference.

In the shown example, there are 3 deep CNNs a deep CNN 504-1 for the input video at high complexity (also referred to as fine video, "F"), a deep CNN 504-2 for the input video at medium complexity (also referred to as finer or medium fine video, "M"), and a deep CNN 504-3 for the input video at low complexity (also referred to as coarse video, "C"). The fine pathway comprises the first deep CNN 504-1. The medium fine pathway comprises the first video generation module 202 and the second deep CNN 504-2. The coarse pathway comprises the second video generation module 204 and the third deep CNN 504-3.

Each deep CNN 504 defines a number of convolution kernels, each convolution kernel comprising a matrix of weights, used in action recognition in videos. Each convolution kernel has a receptive field, which refers to the region of the input that affects it, namely the area of a video that affects it. A convolution kernel can only learn from the parts of the input that affects it. Therefore, having larger receptive fields for convolution kernels can make the kernels learn better representations for the input data. Unfortunately, convolution kernels in deep CNNs suffer from a significantly reduced effective receptive field compared to the theoretical receptive field—the ratio of the effective receptive field to theoretical receptive field is approximately $1/\sqrt{(N)}$, where N is the number of layers between the input and the convolution kernel. It is believed by the present inventors that using full image rather than center cropping improves accuracy on the basis that pixels in a frame that are located far away from the center can also provide valuable information during action recognition in videos.

Figure 8A:
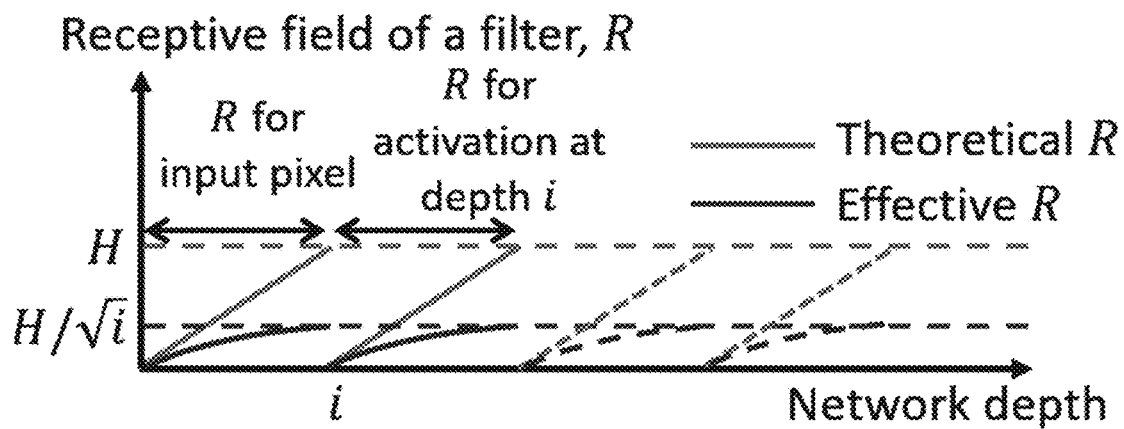
FIG. 8A illustrates a comparison of the theoretical and effective receptive fields for a video at an original resolution.
Figure 8B:
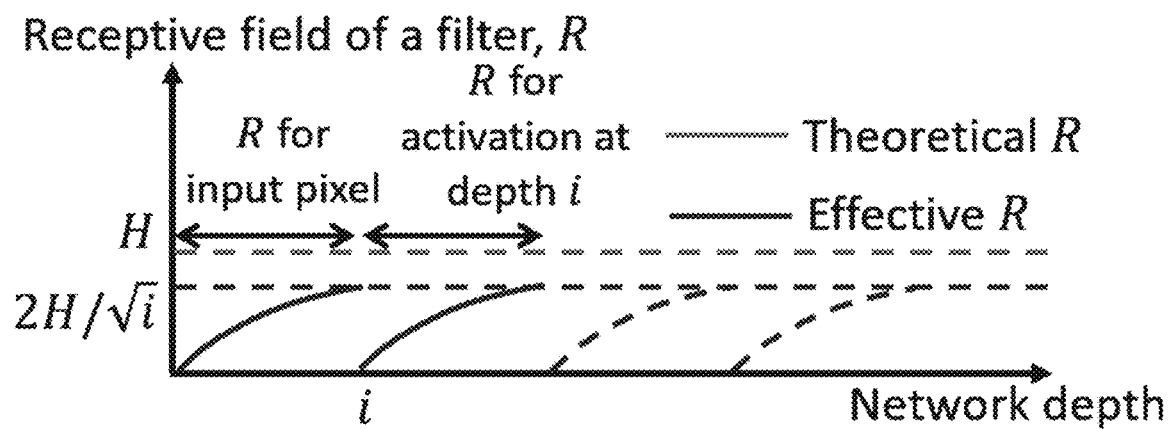
FIG. 8B illustrates a comparison of the theoretical and effective receptive fields for the video of FIG. 8A after it has been downsampled by a factor of 2.

The present inventors believe that large effective receptive fields can help improve accuracy performance of action recognition. The use of spatiotemporally downsizing (e.g., downscaling) on the input video in the manner described above compensates for the decaying effective receptive fields compared to the theoretical receptive fields. Specifically, in the described embodiment of FIG. 5A the input video is progressively downsampled by a factor of 2 in both the spatial and temporal domains. For an input video having height H, and the finest resolution pathway reaching receptive field of H at depth i, the effective receptive field at depth i, $E_i$, approximately equals H√i. Since the same receptive field size on the 2-factor downsampled input video covers twice the input video region along each of the spatiotemporal dimensions, E for the downsampled video pathway at depth i becomes 2H/√i. More formally, $E_{i,n}=2^{n-1} \times H/\sqrt{i}$ with n∈Z: n∈[1, N] where n=1 is the original, non-downsampled input video. While this increased receptive field coverage of convolution kernels comes at the expense of decreased resolution, the loss can be overcome by processing the original full resolution input video. FIG. 8A illustrates a comparison of the theoretical and effective receptive fields for a video at an original resolution. FIG. 8B illustrates a comparison of the theoretical and effective receptive fields for the video of FIG. 8A after it has been downsampled by a factor of 2

The final layer of each of the deep CNNs 504 applies a softmax function that outputs a vector of real values. The vector of real values output by each of the deep CNNs 504 is a probability vector, p, for a class (or set) of actions. The probability vector, p, contains a set of values ranging from 0 to 1 that represent the probability that a corresponding action was present in the video. The action having the highest probability value in the probability vector, p, i.e. the value closet to 1, is the closest match and the most likely action in the video as determined by the respective deep CNN.

The outputs (e.g., features) of the deep CNNs 504 of each pathway are fused by a feature fusion block 508. The feature fusion block 508 concatenates the pre-softmax outputs from each of the deep CNNs 504 via a concatenate block 508-1 and fuses these accumulated features to generate an intermediate output, $I_{C2F}$, through a reparameterized fully connected (FC) layer 508-2. The output of the reparameterized FC layer 508-2, $O_{C2F}$, is referred to as the C2F ensemble and is received as input to decision block 302-1.

The reparameterized FC layer 508-2 adaptively excites gradient flow along the more important features of $I_{C2F}$ during training. Intuitively, for a particular output node of the FREEN 500 (e.g., output node representing "moving hand from right to left" gesture), there are likely some $I_{2F}$ features that are more important than others (e.g., corresponding nodes for "moving hand", "right to left", "left to right" in each of the processing pathways more important than the other nodes). Adaptively exciting gradient flow along these important nodes leads to larger gradient backpropagation along all the learnable deep CNN parameters that contributed to these nodes. This can be achieved by modifying each of the weights (w) of the reparameterized FC layer 508-2 adaptively such that:

$$\omega_r = 0.5 * [((2-\beta)*\omega))^{\circ 1} + (\beta*\omega)^{\circ 3}] \quad (1)$$

$$\nabla_{\omega_{new}} = 0.5 * [(2-\beta)*\nabla_\omega) + 2*\beta^3*(\omega^{\circ 2}*\nabla_\omega) \quad (2)$$

where □ denotes Hadamard power, $\nabla_\omega$ is the backpropagated gradient on w if the above reparameterization was not applied and β is a hyperparameter where β∈ℝ: β∈[0, 2], and $\nabla_{w_{new}}$ is the backpropagated gradient of w. For any, β>0, $w_r$ will have relatively larger magnitude values for larger magnitude w values, and the backpropagated gradient ($\nabla_{w_{new}}$) for higher valued weights will also be higher. Higher values of β will further encourage this asymmetrical gain in magnitude, and at β=0 this asymmetrical gain in magnitude disappears. Notably, since this weight reparameterization is only done during training, no computational cost is added during inference compared to a normal FC layer.

Figure 5B:
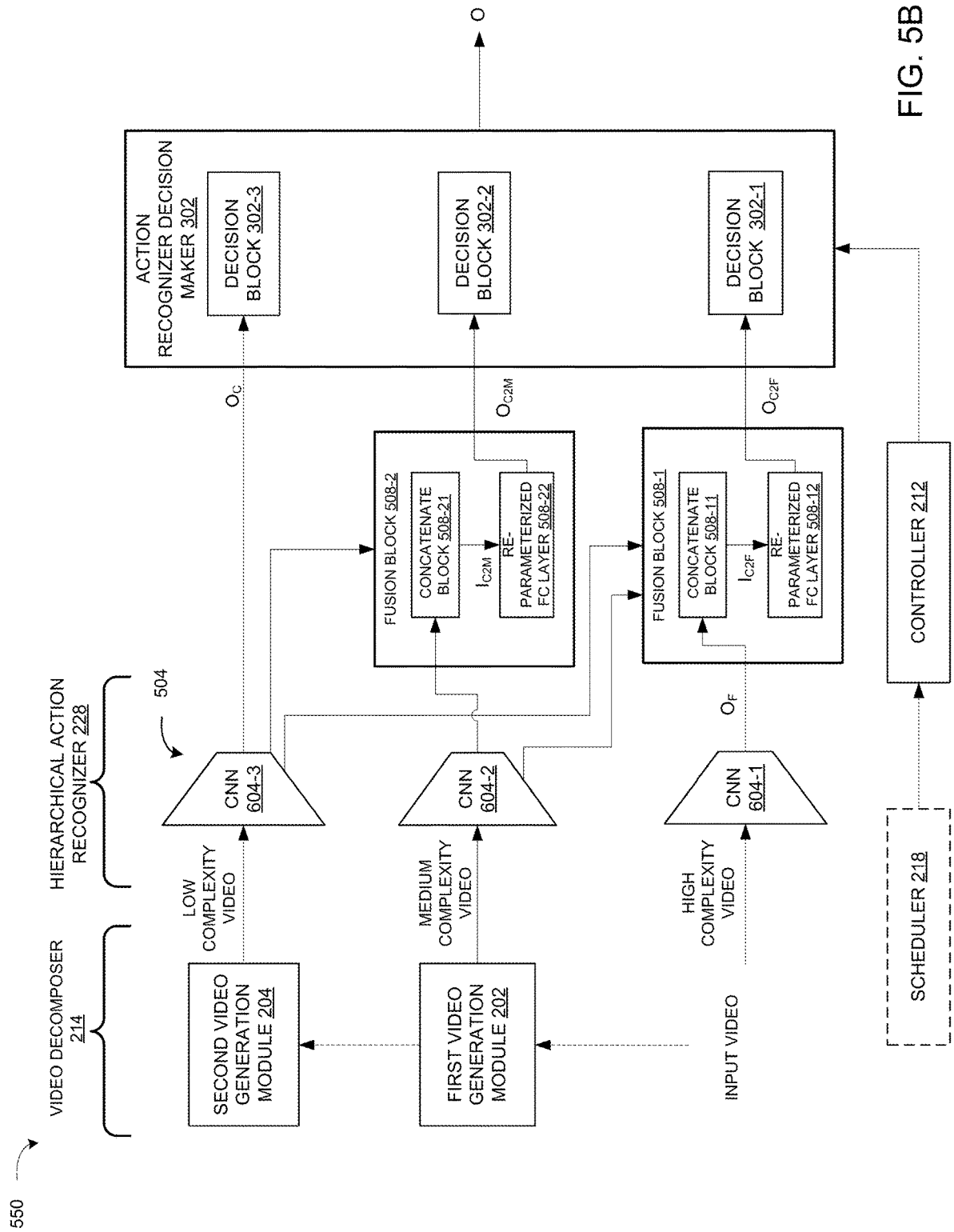
FIG. 5B illustrates a receptive field enhancing ensemble network for implementing the adaptive action recognizer of FIG. 2 in accordance with one embodiment of the present application.

FIG. 5B illustrates a RFEEN 550 for implementing the adaptive action recognizer of FIG. 2 in accordance with another embodiment of the present application. The RFEEN 550 is similar to the RFEEN 500 described above. However, the RFEEN 550 has 2 feature fusion blocks 508-1 and 508-2. The feature fusion block 508-1 concatenates the pre-softmax outputs from each of the deep CNNs 504 (i.e., for the coarse, medium and fine pathways) via a concatenate block 508-11 and fuses these accumulated features to generate an intermediate output, $I_{C2F}$, through a reparameterized FC layer 508-12. The output of the reparameterized FC layer 508-22, $O_{C2F}$, is received as input to decision block 302-1. The feature fusion block 508-2 concatenates the pre-softmax outputs from the deep CNNs 504-2 and 504-3 for the coarse and medium pathways via a concatenate block 508-21 and fuses these accumulated features to generate an intermediate output, $I_{C2M}$, through a reparameterized FC layer 508-22. The output of the reparameterized FC layer 508-22, $O_{C2M}$, is referred to as the C2M ensemble and is received as input to decision block 302-2.

The action recognizer decision maker 302 applies a decision making scheme for generating the action recognition output (O) of the RFEEN 500 and 550 based on a cascading coarse-exit scheme that encourages the recognition of an action output at coarser pathways during inference. The action recognizer decision maker 302 comprises a number of decision blocks 302-1, 302-2 and 302-3.

With respect to the FREEN 500, the decision block 302-3 determines whether a highest probability in the set of probabilities predicted by the deep CNN 504-3 of the coarse pathway, $O_C$, is equal to or greater than the hyperparameter, T. If so, an action has been recognized and an indication of the corresponding action or class of action is output by the action recognizer decision maker 302. If not, the medium pathway is used to process and analyze the medium complexity video after which the decision block 302-2 determines whether a highest probability in the set of probabilities predicted by the deep CNN 504-2 of the medium pathway, $O_M$, is equal to or greater than the hyperparameter, T. If so, an action has been recognized and an indication of the corresponding action or class of action is output by the action recognizer decision maker 302. If not, the fine pathway is used to process and analyze the high complexity video (fine video), which is the combine with the results of the coarse pathway and medium pathway to generate the ensemble output, $O_{C2F}$. The decision block 302-1 determines whether a highest probability in the set of ensemble probabilities is equal to or greater than the hyperparameter, T. If so, an action has been recognized and an indication of the corresponding action or class of action is output by the action recognizer decision maker 302. If not, an indication that no action has been detected is output by the action recognizer decision maker 302. Alternatively, the action recognizer decision maker 302 may output the action or class of action corresponding to the highest probability in the set of probabilities predicted by the deep CNN 504-1 of the ensemble pathway, $O_{C2F}$, irrespective of whether that the highest probability is equal to or greater than the hyperparameter, T.

With respect to the FREEN 550, the decision block 302-2 determines whether a highest probability in the set of ensemble probabilities of the coarse-to-medium ensembled output, $O_{C2M}$, is equal to or greater than the hyperparameter, T. If so, an action has been recognized and an indication of the corresponding action or class of action is output by the action recognizer decision maker 302. If not, the fine pathway is used to process and analyze the high complexity video (fine video), which is the combine with the results of the coarse pathway and medium pathway to generate the ensemble output, $O_{C2F}$, as described above.

Alternatively, in other embodiments the non-ensemble outputs $O_C$, $O_M$, $O_F$ of the deep CNNs 504-1, 504-2 and 504-3 may be used in decision blocks 302-1, 302-2 and 302-3 so that the action recognizer decision maker 302 the output of the network is based on the coarse, medium or fine pathway without ensemble.

The action recognizer decision maker 302 encourages using coarser pathways having low average computational costs while retaining high accuracy. Inference starts with forward propagation along the coarsest pathway for fast inference. To ensure that action recognition at the coarsest pathway is performed accurately, action recognition is performed only when the softmax output $P_N \geq T$, where T is a hyperparameter controlled externally from the RFEEN 500, for example, by the controller 212. The hyperparameter T has a value ranging from 0 and 1.

The hyperparameter T is a free parameter that enables the FREEN 500 to operate in a continuously flexible cost-accuracy tradeoff manner bounded only by the cost-accuracy points of the coarsest and finest pathways. The hyperparameter T is related to the probabilities output by the deep CNNs 504 (and the FREEN 500) and the computational costs. In general, as the value of hyperparameter T increases, the probabilities output by the deep CNNs and the FREEN 500 increases (i.e., the confidence in the action recognition increases) and the computational costs of the FREEN 500 increases as does the likelihood a finer (or more complex) processing pathway will be used the FREEN 500. The relationship between the hyperparameter T and the probabilities output by the by the deep CNNs 504 (and the FREEN 500) is complex and non-linear, and is affected by the video quality and complexity (resolution, frame rate, nature of the scene, etc.), the action complexity, the network configuration, and the network training, among other factors.

To account for overconfidence in the probabilities of the softmax outputs that may occur and that the softmax outputs may not be well calibrated for uncertainty measures, the softmax output $P_N$ may be adjusted using a global training accuracy context as follows:

$$p_N^C = 1 - (1-p) * e_N / e_1 \qquad (3)$$

where $p_N^C$ is the adjusted softmax output for the coarsest pathway C, p is the non-adjusted softmax output for the pathway, $e_N$ is the training misclassification rate for the coarsest pathway, and $e_1$ is the training misclassification rate at the end of the C2F ensemble. Similar to the above example for the coarsest pathway, finer pathways in the RFEEN 500 also have adjusted softmax scores and are only invoked when the coarse-exit in a coarser pathway fails, i.e. $P_N < T$.

The hyperparameter T may be based on a budget computational resource, B, which may be received as input from the host computing device or scheduler 216. The computational resource is a measure of the computational resource(s) available which may be, for example, a budgeted floating point operations per second (FLOPS). The controller 212 may continuously modify the hyperparameter T as follows:

$$T = T_{av} + (B - f_{av}) * \frac{f_{av} - f_{C2F}}{T_{av} - 1.0} \qquad (4)$$

where B∈R: B∈[$f_C$, $f_{C2F}$], $f_C$ is the actual computational cost (e.g., FLOPS) used by the coarse pathway C for a single recognition, $f_{C2F}$ is the actual computational cost of the C2F ensemble for a single recognition, $f_{av}$ is a running average computational resource (e.g., FLOPS) and $T_{av}$ is the average of previous recognitions for r recognitions, with a default value of r=100. The controller 212 attempts to operate the RFEEN 500 at the desired computational budget B and modifies the coarse-exit decision criteria (i.e., hyperparameter T) so that the RFEEN 500 operates at or close to the given computational budget B. Thus, it is only when the RFEEN 500 is operating at the desired budget (i.e., B−$f_{av}$=0) that the hyperparameter T is not updated. A small value for r results in faster changes in the hyperparameter T whereas a larger value for r results in slower changes in the hyperparameter T. The parameter r may itself be a hyperparameter controlled externally from the RFEEN 500, for example, by the controller 212.

Although increasing value of r makes the RFEEN 500 respond more slowly to a modified budget computational resource, this also makes the response smoother meaning that the change in accuracy will be smooth as well. This is a design choice that would depend on the application. For example, in applications in which the RFEEN 500 is desired to quickly adjust to modified budget computational resource, smaller values of r should be used. On the other hand, in applications in which the RFEEN 500 is desired to have a smooth transition between varying computational costs (and varying accuracy performance) which may make the application more user friendly, larger values of r should be used.

Figure 6:
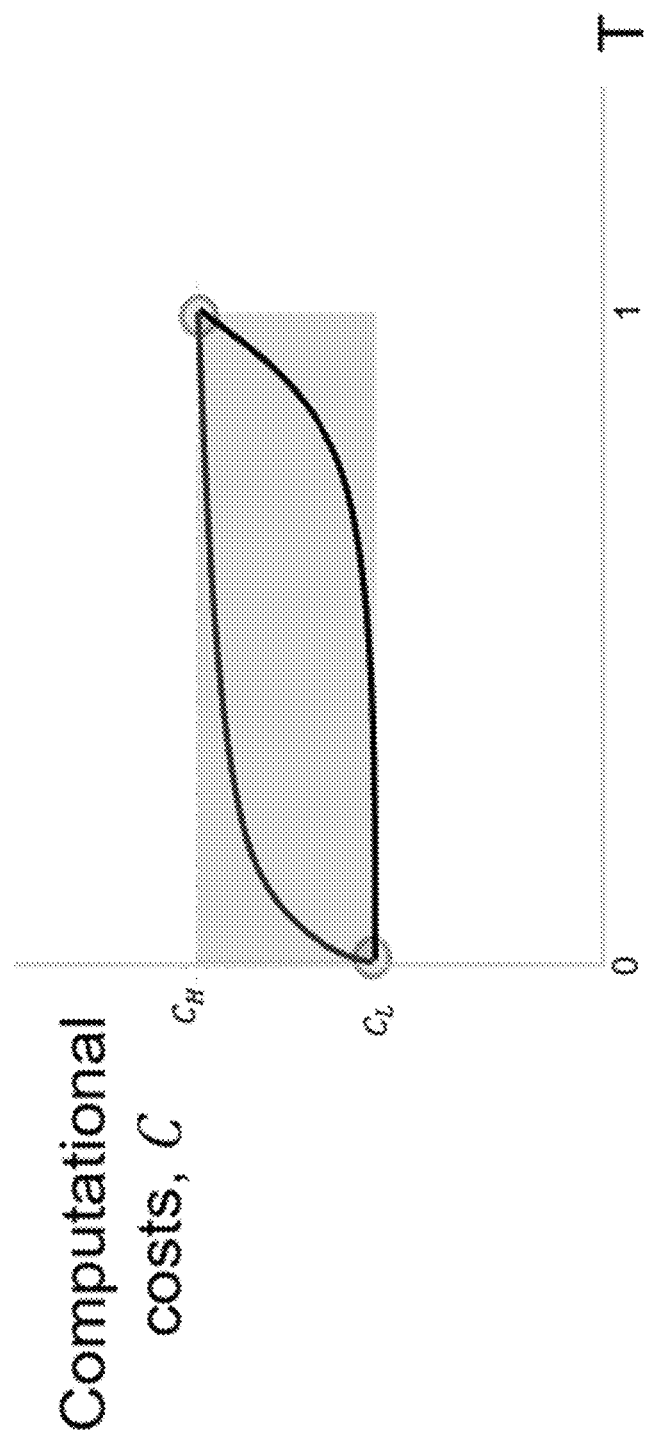
FIG. 6 illustrates operational characteristics for an adaptive action recognizer in accordance with the present application.

The optimization of the hyperparameter T is based on estimating the optimal operating point of the adaptive action recognizer 200 between a lowest computational cost, $C_L$, that corresponds to processing using the coarse pathway and a highest computational cost, $C_H$, that corresponds to processing using the fine pathway. An operational characteristics curve of computational cost vs. complexity curve may be used to represent the operational characteristics of a processing pathway of the adaptive action recognizer 200, such as the fine, medium or coarse processing pathway of the RFEEN 500 or 550, where the complexity is represented by the hyperparameter T. Examples of operational characteristics curves are illustrated in FIG. 6. Each computational cost vs. complexity curve represents the operational characteristics of the adaptive action recognizer 200 when operating along a given processing pathway. The upper curve in FIG. 6 represents the operational characteristics of a high complexity pathway and the lower curve in FIG. 6 represents the operational characteristics of a low complexity pathway such as the coarse processing pathway.

An operational characteristics region is a simple region bound by computational costs on the vertical axis, from $C_L$ to $C_H$, and by hyperparameter T on the horizontal axis, from 0 to 1. The operational characteristics region can be used to derive an optimal value for the hyperparameter T as described below. The shaded region in FIG. 6 is an example of an operational characteristics region of the adaptive action recognizer 200. For a video that is relatively simple to process, such as a video of surveillance at night and in which no activity occurs, the adaptive action recognizer 200 will tend to have low computational costs close to $C_L$ and only for T values close to 1 will the adaptive action recognizer 200 have computational costs close to $C_H$ (the lower curve). In contrast, for a video that is relatively difficult to process, the adaptive action recognizer 200 will tend to have high computational costs close to $C_H$ (the top curve). However, in practice the video complexity typically varies. For example, when the video is of a driver interacting with gestures while driving a vehicle, most of the time the video may contain no gesture, whereas at some time periods the video may contain many gestures performed consecutively.

Figure 9:
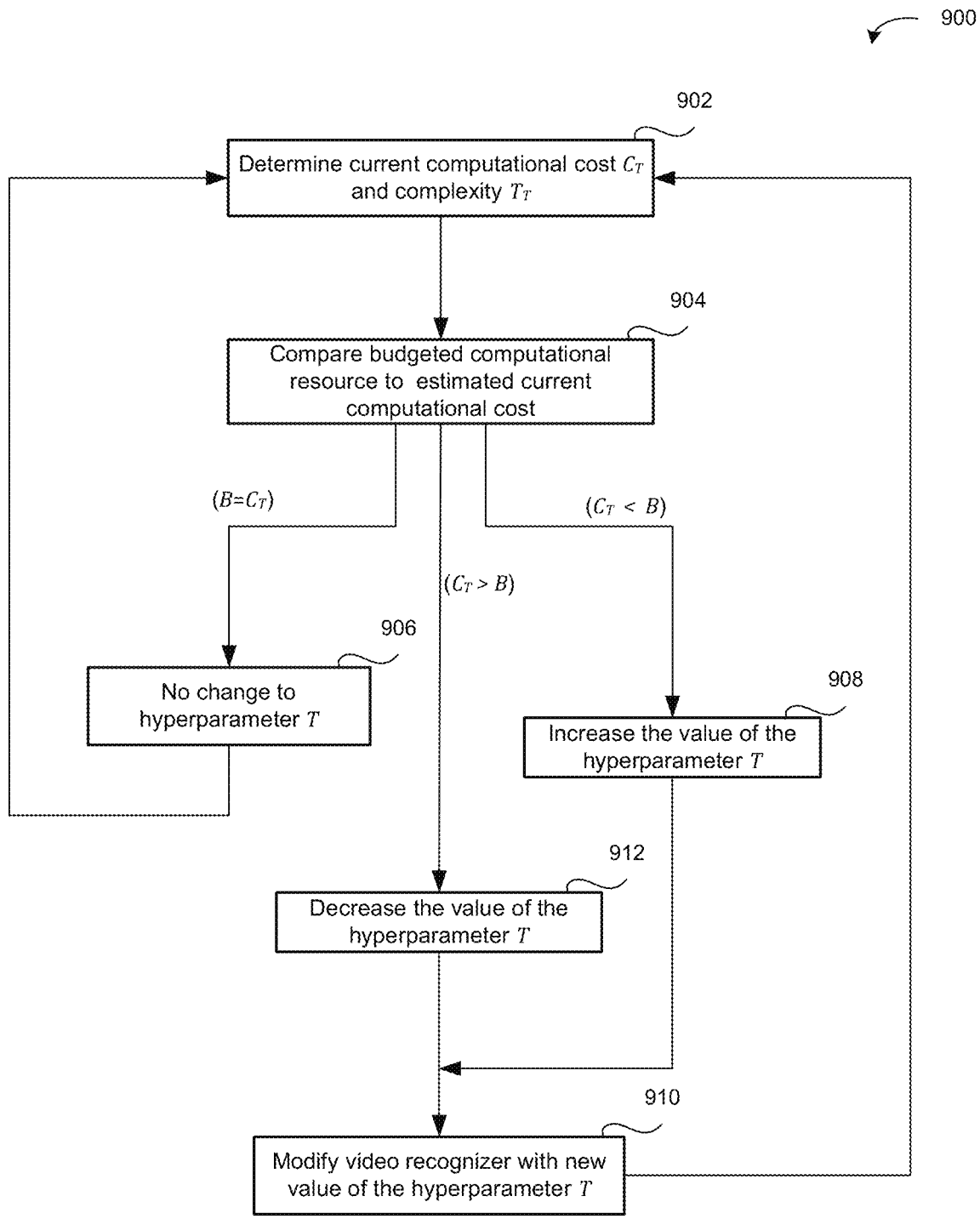
FIG. 9 illustrates a method of optimizing the operation of the adaptive action recognizer of FIG. 2 in accordance with one embodiment of the present application.

FIG. 9 illustrates a method 900 of optimizing the operation of the adaptive action recognizer of FIG. 2 in accordance with one embodiment of the present application. The method 900 presents an alternate approach to optimizing the hyperparameter T.

Figure 7:
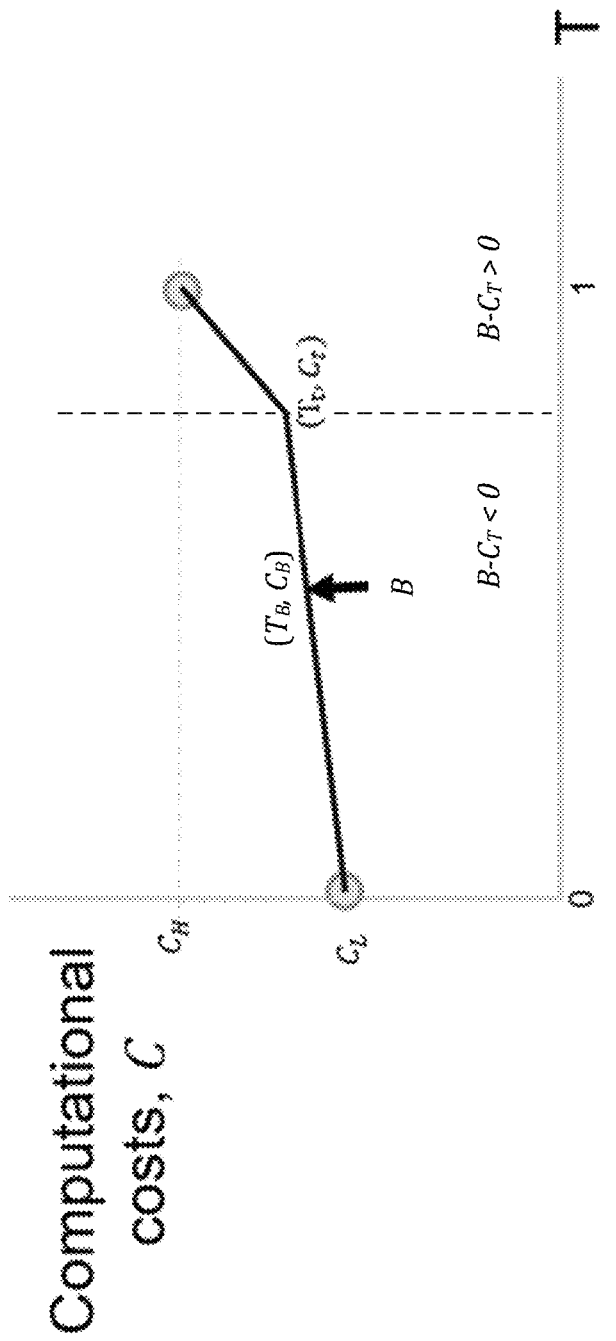
FIG. 7 illustrates example operational characteristics for an adaptive action recognizer in accordance with the present application.

At operation 902, the controller 212 determines the current operating point on the operational characteristics curve at time, t, ($T_t$, $C_t$). The current operating point is illustrated in the example operational characteristics curve of FIG. 7. In some examples, an averaging scheme is used based on equation (4) described above where $T_t$ is $T_{av}$, $C_t$ is $f_{av}$, and r is a hyperparameter that is controlled externally. Referring to FIG. 7, the operational characteristics curve may be derived as two straight lines: the first straight line connecting $C_L$ (0, $C_L$) and the estimated operating point ($T_t$, $C_t$); the second straight line connecting the estimated operating point ($T_t$, $C_t$) and $C_H$ (1, $C_H$) where the desired operating point is at the budget computational resource B ($T_B$, $C_B$).

At operation 904, the controller 212 determines whether the current computational cost at time t, $C_t$, of the adaptive action recognizer 200 is equal to, less than, or greater than the budget computational resource, B. At operation 906, in response to a determination that the current computational cost of the adaptive action recognizer 200, $C_t$, is equal to the budget computational resource, B, the hyperparameter T is left unchanged.

At operation 908, in response to a determination that the current computational cost of the adaptive action recognizer 200, $C_t$, is less than the budget computational resource, B, the hyperparameter T is increased. In some examples, the hyperparameter T is increased in accordance with the following equation:

$$T_{new} = \frac{T_t - 1}{C_t - C_H} * (B - C_t) + T_t \quad (5)$$

At operation 912, the controller 212 modifies the adaptive action recognizer 200, e.g., RFEEN 500 or 550, by using T=$T_{new}$.

At operation 910, in response to a determination that the current computational cost of the adaptive action recognizer 200, $C_t$, is greater than the budget computational resource, B, the hyperparameter T is decrease. In some examples, the hyperparameter T is decreased in accordance with the following equation:

$$T_{new} = \frac{T_t}{C_t - C_L} * (B - C_t) + T_t \quad (6)$$

At operation 912, the controller 212 modifies the adaptive action recognizer 200, e.g., RFEEN 500 or 550, by using T=$T_{new}$.

Alternatively, rather than using equation (4) described above the current operating point on operational characteristics curve can be determined using an averaging scheme is used based on the following formulae:

$$C_t = \beta * C_{(t-1)} + (1-\beta) C_t \quad (7)$$

$$T_t = \beta * T_{(t-1)} + (1-\beta) T_t \quad (8)$$

wherein the parameter β represents the sensitivity to noise in the video and ranges between 0 and 1. A high value of β is less sensitive to noise and more robust. A low value for β is more sensitive to noise and more robust. The value of β may be set based on the application with which the adaptive video recognizer 200 will be used. It has been found by the present inventors that a value of β=0.9 has the effect of generating a smoothed and reliable estimate value for both $C_t$ and $T_r$.

Extension of Control Scheme to Multiple Devices

The use of the budget computational resource to control the hyperparameter T can be extended to a group of multiple devices, for example, when the adaptive action recognizer, i.e., RFEEN 500 or 550, is shared across multiple devices and/or the group of devices jointly perform the video recognition method. The devices in the group may be the same or different. In other words, the same adaptive action recognizer (i.e., same network) may be deployed to multiple devices. The group of devices may comprise IoT or "smart" devices including, but not limited to, a smart phone, smart TV, an alarm (siren), camera (including video camera), emergency button, smoke detector, fuel gas detector, remote controller, motion detector such as a passive infrared (PIR) motion detector, door sensor, smart socket, glass break sensor, or environmental sensor. The group may form, or be part of, a smart home system contains a number of smart devices. The controller 112 can automatically decide the level of complexity that should be executed on different devices. It be appreciated that different devices have different computational resources. When an adaptive action recognizer task is to be performed, scheduler 218 determines device performs the task depending on data transfer time, computational resources, etc. as described more fully below.

Figure 10:
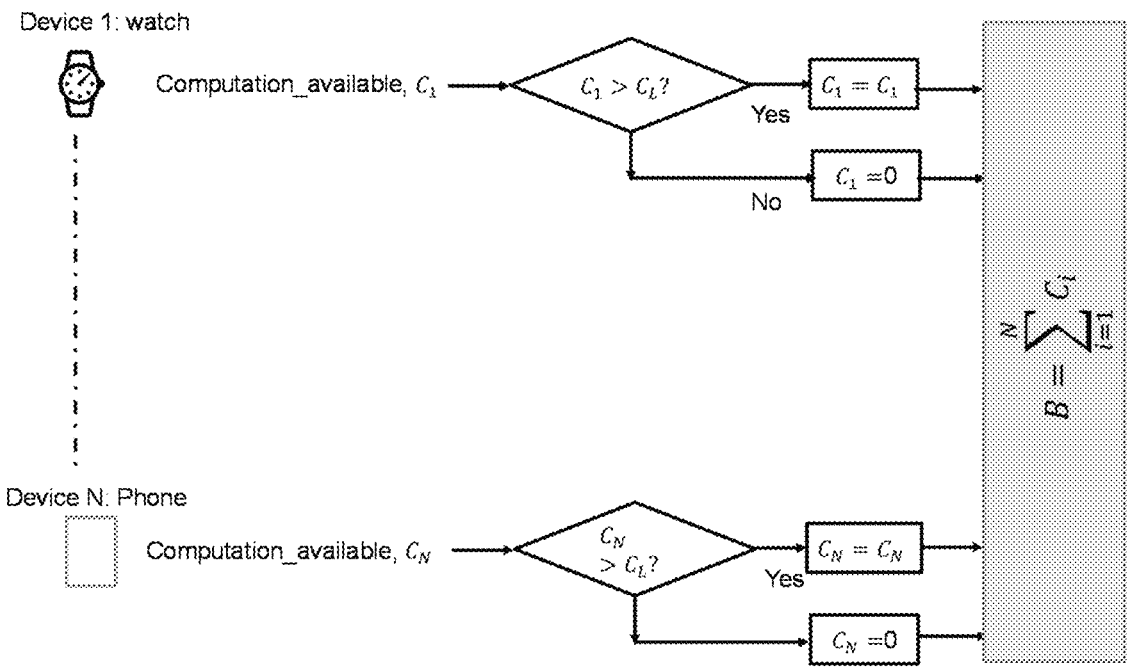
FIG. 10 illustrates workflow of a multidevice computational status-based determination of the budget computational resource in accordance with one embodiment of the present application.
Figure 11:
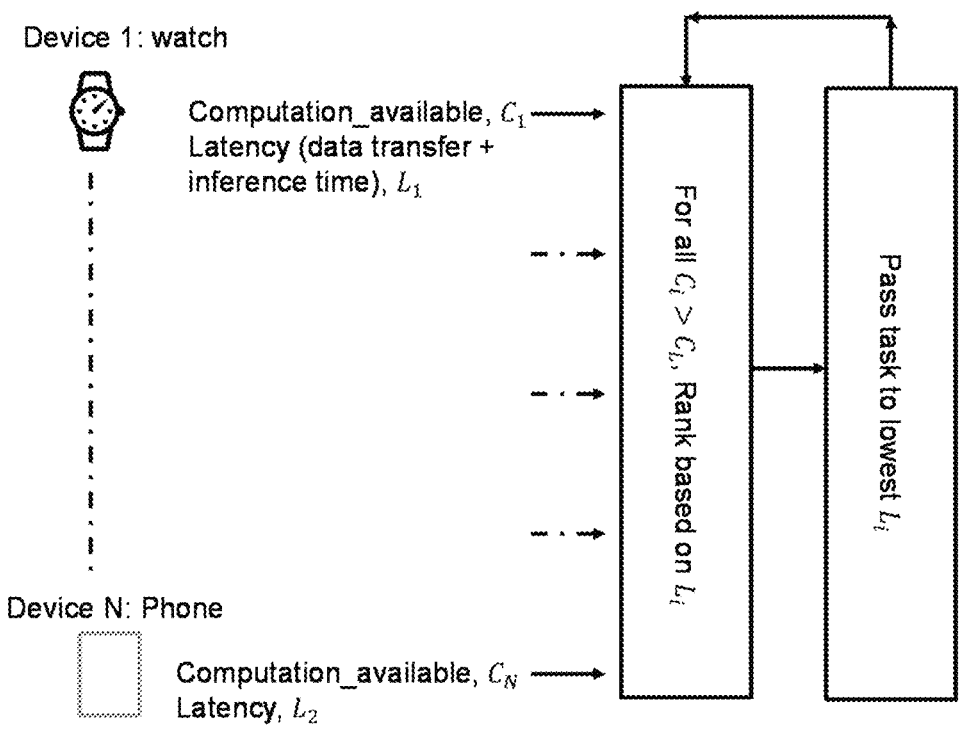
FIG. 11 illustrates workflow of multidevice scheduling in accordance with one embodiment of the present application.

FIG. 10 illustrates the workflow of a multidevice computational status-based determination of the budget computational resource, B, in accordance with one embodiment of the present application. FIG. 11 illustrates a workflow of multidevice scheduling in accordance with one embodiment of the present application. As shown in FIG. 10, the multidevice status is used to determine the budget computational resource, B. If a device lacks the computational capability to run the lowest computational part of the adaptive action recognizer, i.e. computational resource available, $C_i$, is less than $C_L$, the computational resource of that device does not get used nor included in the determination of the budget computational resource. For each device, i, in a group of N device, it is determined whether the computational resources available for that device, $C_i$, is equal to or greater than the lowest computational cost of the $C_L$ of the adaptive action recognizer, i.e., the lowest complexity pathway.

If the computational resources available for that device, $C_i$, is equal to or greater than the lowest computational cost of the $C_L$ of the adaptive action recognizer, the computational resources available of that device is added to the budget computational resource, B:

$$B = \sum_{i=1}^{N} C_i, \text{ if } C_i \geq C_L \tag{9}$$

If the computational resources available for that device, $C_i$, is less than the lowest computational cost of the $C_L$ of the adaptive action recognizer, the computational resources available of that device is not added to the budget computational resource, B.

In other words a device is included in the group of devices and its available computational resource is included in the budget computational resource in response to a determination the available computational resource of the respective device is equal to or greater than a computational cost of the first action recognizer 304.

As shown in FIG. 11, the scheduler 218 determines, for each device in the group having computational resources available, $C_i$, equal to or greater than the lowest computational cost of the $C_L$ of the adaptive action recognizer, a latency of the respective device, $L_i$, is determined The latency is dependent on at least factors: the data transfer time (both receiving and transmitting) and the inference time. The scheduler 218 ranks the latency of each of the devices in the group having computational resources, $C_i$, equal to or greater than the lowest computational cost of the $C_L$ of the adaptive action recognizer, from lowest to highest. The scheduler 218 then allocates processing tasks to each of the devices in this subgroup. The processing tasks may comprise a plurality of video frames for action recognition. The number of video frames allocated may be based on the latency of the respective device, the computational resources available, or both. This process is repeated in round robin fashion until all processing tasks are completed. Because the latency and/or computational resources available for each device in the group may vary over time due to multitasking, changing network conditions affecting the data transfer times, the latency and/or computational resources available for each device in the group may be redetermined periodically, for example, after each round (or cycle) or after a predetermined number of rounds (or cycles), and the budget computational resource and the ranking by latency of each respective device redetermined.

The controller 212 and scheduler 218 may be one of the devices in the group of multiple devices or may be external to the group of multiple devices. The controller 212 and scheduler 218 may be embodied by one device.

Training

The spatiotemporal decomposition block (video decomposer 214), the receptive field enhancing complementary pathways block (hierarchical action recognizer 228), and the feature fusion block 508 of the RFEEN 500 and 550 are trained using supervised learning (e.g., using a supervised learning algorithm and a training dataset including labelled training samples) in end-to-end fashion using a loss function that is able to jointly optimize all of the deep CNNs 504. Each labelled training data sample includes a RGB video input with a specific number of frames (default value of 16) and a corresponding label indicative of an action in the RGB video input. In one example, a training data sample includes the RGB video input corresponding to a 16 frame video (or 3.2 seconds at 5 frames per second) and a label of 'walking'. The purpose of the training is for the RFEEN 500 and 550 to learn from labelled training samples such as this and during inference to predict a label indicative of from a set of action classes given an input RGB video with specific number of frames. The training can be broadly divided to two steps—forward propagation and backward propagation.

Forward propagation: The RGB input is first downsampled spatiotemporally (i.e., across both space and time axes). Each of the downsampled inputs along with the original input go through separate convolutional networks, i.e. the deep CNNS 504-1, 504-2 and 504-3. Since the input sizes progressively become smaller compared to the convolutional network filter sizes, the receptive fields increase for lower resolution pathways. Thus, the lower resolution pathway which loses fine detail due to decreased resolution, provides complementary information via receptive field enhancement. At the end of each convolutional network pathway is a fully connected layer (FC), the output of which is a feature vector of the same size as the number of action classes that the network is trained to classify. For example, if the network is trained to classify 200 classes, the size of the feature vector will also be 200. This feature vector goes through a softmax layer resulting in a probability feature vector of the same size as number of action classes (i.e., 200 with above example). These softmax outputs are prediction outputs of each convolutional network pathways (three pathways in the diagram above). These softmax outputs are all concatenated and then the concatenated features are passed through a reparemeterized fully connected layer as described above. The reparameterized fully connected layer is a novel extension of a fully connected layer which has a feature vector output of the same size as the number of action classes that the network is trained to classify (i.e., 200 in above example). This also goes through a softmax layer.

Backward propagation: All the softmax layer outputs (i.e. $O_C$, $O_M$, $O_F$ and $O_{C2F}$ in RFEEN 500 or $O_C$, $O_M$, $O_F$, $O_{C2M}$ and $O_{C2F}$ in RFEEN 550) are compared with the label, and loss is computed for each of them. The losses are then accumulated based on a multi-loss function, which for the RFEEN 500 is:

$$L = \sum_{n=1}^{N} \alpha * L_n + (1-\alpha) * L_{C2F} \tag{10}$$

where $L_n$ and $L_{C2F}$ are the softmax cross-entropy losses comparing ground truth $\hat{O}$ with $O_n$ and $O_{C2F}$, respectively, $O_n$ is the output at pathway n, $O_{C2F}$ is the output after the reparameterized FC layer, and $\alpha \in R : B \in [0, 1]$. A high value of $\alpha$ will cause the RFEEN 500 or 550 to focus only on optimizing each of the pathways, whereas a low value of $\alpha$ will cause the RFEEN 500 or 550 to focus more on extracting complementary information for improving $O_{C2F}$. To improve the performance of coarser pathways, the computation can be exited early to save computational costs by setting a high value of $\alpha$, such as $\alpha=0.9$.

The losses are then backpropagated through the separate convolutional neural networks, i.e. the deep CNNS 504-1, 504-2 and 504-3. A stochastic gradient descent optimization is used to update the trainable parameters of the convolutional neural network.

The processing pathways are trained to together using a joint optimization formulation with a multi-loss function with the result that the RFEEN 500 and 50 are trained so that each processing pathway is reliable for action recognition by itself and also provides complementary features for use by the finer pathways during fusion. The multi-loss function defined above is differentiable so that the joint optimization method is end-to-end differentiable and the different processing pathways can be trained together.

Multi-Loss Paradigm with Pre-Trained Fine Pathway

The student-teacher learning paradigm involves a large network that is already trained to train a smaller network what it has already learned in a similar way to how a teacher teaches a student. In the classroom learning paradigm, the analogy is extended and premised on the notion that students may learn from other students and that the classroom may learn better as a whole. In the context of network learning, the classroom learning paradigm uses the most complex CNN as the teacher, i.e. the deep CNN 504-1 for the finest pathway F. The deep CNN 504-1 may be trained to recognize actions in videos based on fine video, i.e. high resolution RGB video. The deep CNN 504-1 can then be used to teach the coarser pathways (i.e., the coarse and medium pathway) and additionally a classroom in the form of the reparameterized FC layer(s) learns both from the students and the teacher to perform better than the finest pathway F. Similar to student-teacher learning, the deep CNN 504-3 for the fine pathway F is no longer trained and is only used for teaching the deep CNNs for the coarser pathways (i.e., students) such as the deep CNNs 504-1 and 504-2 for the coarse and medium pathways, respectively. To optimize the C and M pathways and the reparameterized FC layer(s), the RFEEN 500 by minimizing the following multi-loss function:

$$L_d = \sum_{n=1}^{N} \alpha * L_{n,KLD} + \sum_{n=1}^{N} (1-\alpha/2) * L_n + (1-\alpha/2) * L_{C2F} \tag{11}$$

where $L_{n,KLD}$ is the Kullback-Leibler divergence between the distributions of $P_N/T$ and $P_F/T$, $P_N$ is the softmax output of the nth pathway, $P_F$ is the softmax output of F, T is a temperature parameter empirically set as 6.0 to soften the distributions between $P_F$ and $P_N$, and $\alpha$ is a hyperparameter empirically set as 0.1. The primary difference in $L_d$ from the original knowledge distillation scheme is the $(1-\alpha/2)L_{C2F}$ term that encourages each of the coarse pathways to provide some complementary information to F that may help in improving overall performance of $O_{C2F}$.

The multi-loss functions presented above can be modified for use with the RFEEN 550 or other networks.

The adaptive action recognizer 200 of the present application, including the hierarchical action recognizer 228, may be evaluated in terms of accuracy and computational costs reduction results using popular gesture recognition datasets, such as the known 20BN-jester V1 datasets, the known Something-Something V1 datasets, and known the Something-Something V2 dataset. Experimental results indicate that the adaptive action recognizer 200, such as the RFEEN 500, improve accuracy and reduce computational costs. FIG. 12 illustrates experimental results summarized in a table that compares performance of various implementations of the RFEEN 550 with state-of-the-art methods on the known 20BN-jester dataset. Experiments have also been performed with respect to the RFEEN 500 and the performance was comparable to the RFEEN 550 with faster and better training with higher recognition accuracy and a simpler network construction.

As shown in the table of FIG. 12, in the validation data of the 20BN-jester dataset, using the default coarse-exit threshold, the RFEEN 550 recognized 42.2% of the video using the coarse pathway (first action generator), 13.7% of the video using the medium pathway (second action generator), and the rest 44.1% at the fine pathway (third action generator). This corresponds to around 45% reduction in computational costs compared to using only the fine pathway (third action generator).

In the validation data of the 20BN-jester dataset, the RFEEN 550 achieved an accuracy of 96.48% without coarse-exit and 96.45% with coarse-exit. Both of these accuracy numbers are higher than the previous state-of-the-art of 96.35%. Furthermore, the computational cost of the RFEEN 550 with coarse-exit is around only 15% of the previous state-of-the-art, so RFEEN 550 is remarkably faster and more efficient.

In a comparison of the proposed end-to-end RFEEN 550 to two naïve coarse-to-fine ensembling schemes: first, summing up softmax scores of each neural networks of the action recognizers; second, using a product of softmax scores of each neural network of the action recognizers. Both of the naïve ensembling schemes consistently performs poorer compared to our end-to-end RFEEN 550 (96.48% with RFEEN 550 vs. 95.34% with additive naïve ensemble and 95.27% with multiplicative naïve ensemble). In fact both of these naïve ensemble approaches perform poorer to the third action recognizer (accuracy 96.35%). This reduction in accuracy performance is likely due to relatively weaker classifier output of the neural network of the first action recognizer confounding the outputs at finer pathways.

The training of the RFEEN 550 in an end-to-end fashion may be compared to the training of each of the neural networks of the action recognizers separately and then training the ensemble fully connected layer. Here again, the end-to-end learning seems to outperform learning pathways and ensemble separately (96.48 with end-to-end vs 96.32% with separate learning). Similar to naïve ensemble, the accuracy of RFEEN 550 without end-to-end learning slightly decreases overall accuracy. This is likely because the ensemble in the absence of multiple loss functions tends to start over-fitting in different segments of the overall ensemble network.

Figure 13:
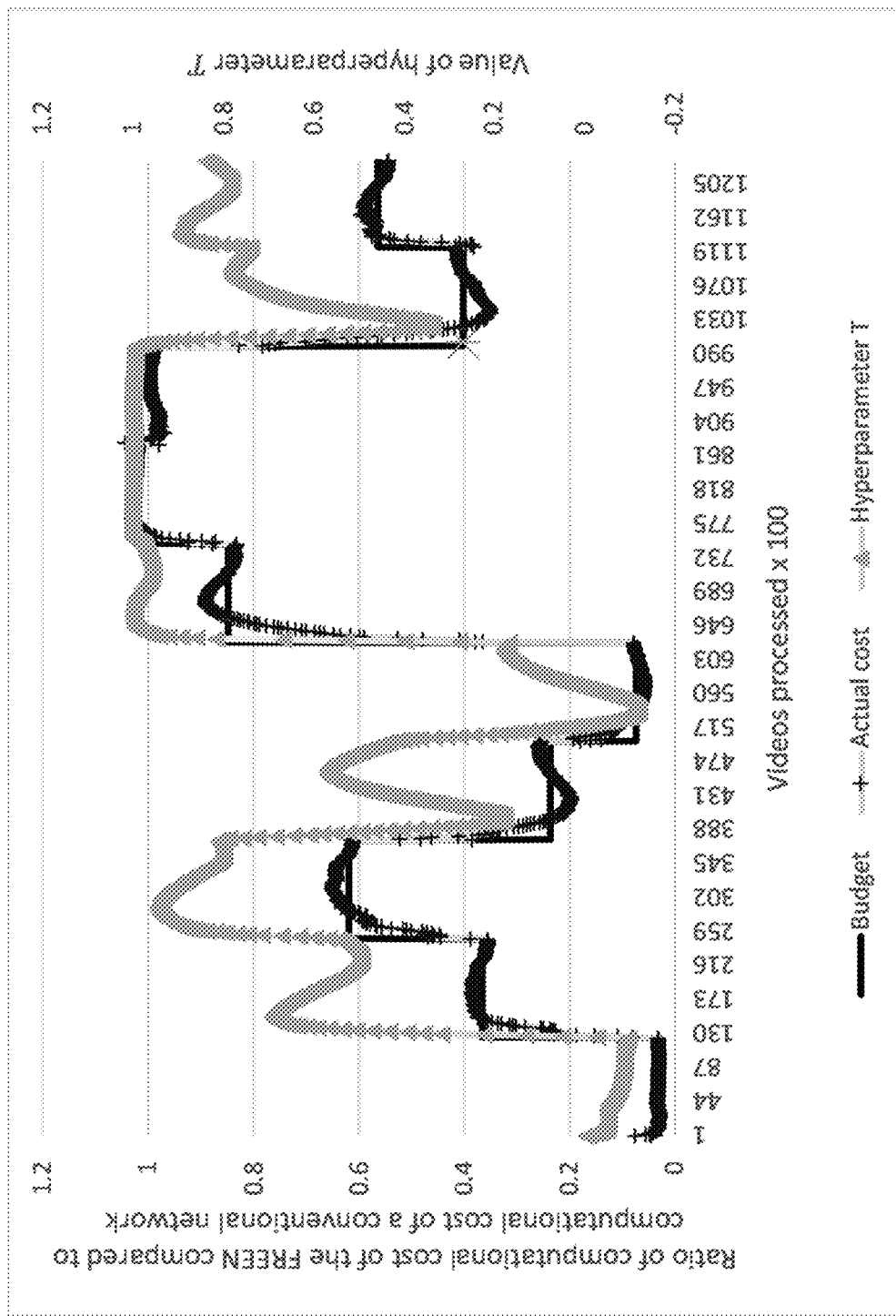
FIG. 13 is a graph illustrating the ability of a controller of the adaptive action recognizer to maintain a budget computational cost using a hyperparameter T on the Something-something V2 dataset.

FIG. 13 is a graph illustrating the ability of the controller 212 to maintain a budget computational cost using a hyperparameter T on the Something-something V2 dataset. The data was obtained using the RFEEN 500 and compares the ratio of the computation cost of the RFEEN 500 compared to the computation cost of a conventional network to the hyperparameter T per the number of videos processed.

Although the foregoing description is described primarily in terms of action recognition in videos, the teachings of the present disclosure may be applied to any classification task to be performed on videos with suitable adaptions for the classification task to be performed.

General

The steps and/or operations in the flowcharts and drawings described herein are for purposes of example only. There may be many variations to these steps and/or operations without departing from the teachings of the present application. For instance, the steps may be performed in a differing order, or steps may be added, deleted, or modified, as appropriate.

The coding of software for carrying out the above-described methods described is within the scope of a person of ordinary skill in the art having regard to the present application. Machine-readable code executable by one or more processors of one or more respective devices to perform the above-described method may be stored in a machine-readable medium such as the memory of the data manager. The terms "software" and "firmware" are interchangeable within the present application and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements.

Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present application is described at least in part in terms of methods, a person of ordinary skill in the art will understand that the present application is also directed to the various elements for performing at least some of the aspects and features of the described methods, be it by way of hardware, software or a combination thereof. Accordingly, the technical solution of the present application may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present application may be embodied in other specific forms without departing from the subject matter of the claims. The described example embodiments are to be considered in all respects as being only illustrative and not restrictive. The present application intends to cover and embrace all suitable changes in technology. The scope of the present application is, therefore, described by the appended claims rather than by the foregoing description. The scope of the claims should not be limited by the embodiments set forth in the examples, but should be given the broadest interpretation consistent with the description as a whole.

The invention claimed is:

1. A method of action recognition in video, comprising:
processing a high complexity video to generate a medium complexity video and a low complexity video;
processing the low complexity video to recognize a class of actions in the low complexity video, where a first set of probabilities for the class of actions is output in response to the processing the low complexity video, one probability associated with each action in the class of actions;
processing the medium complexity video to recognize the class of actions in the medium complexity video in response to a determination that a highest probability in the first set of probabilities is below a threshold, wherein a second set of probabilities for the class of actions is output in response to the processing the medium complexity video, one probability associated with each action in the class of actions; and
processing the high complexity video to recognize the class of actions in the high complexity video in response to a determination that a highest probability in the second set of probabilities is below the threshold, wherein a third set of probabilities for the class of actions is output in response to the processing the high complexity video, one probability associated with each action in the class of actions.

2. The method of claim 1, further comprising:
outputting an action having the highest probability in the first set of probabilities in response to a determination that the highest probability in the first set of probabilities is equal to or greater than the threshold:
outputting an action having the highest probability in the second set of probabilities in response to a determination that the highest probability in the second set of probabilities is equal to or greater than the threshold; and
outputting an action having the highest probability in the third set of probabilities in response to a determination that the highest probability in the third set of probabilities is equal to or greater than the threshold.

3. The method of claim 2, wherein the threshold is a hyperparameter T based on a budget computational resource B.

4. The method of claim 3, wherein the hyperparameter T is optimized as follows in accordance with the following equation:

$$T = T_{av} + (B - f_{av}) * \frac{f_{av} - f_{C2F}}{T_{av} - 1.0}$$

where B∈ ℝ :B∈[$f_C$, $f_{C2F}$], $f_C$ is an actual computational cost to generate the firs set of probabilities for a single recognition, $f_{C2F}$ is the actual computational cost to generate the ensemble set of probabilities for a single recognition, $f_{av}$ is a running average computational resource and $T_{av}$ is the average of previous recognitions for r recognitions.

5. The method of claim 1, further comprising:
in response to the determination that a highest probability in the second set of probabilities is below the threshold:
combining the first, second and third set of probabilities to generate an ensemble set of probabilities; and
outputting an action having the highest probability in the ensemble set of probabilities in response to a determination that the highest probability in the ensemble set of probabilities is equal to or greater than the threshold.

6. The method of claim 5, wherein a first deep convolutional neural network (CNN) comprising multiple fully connected layers is used to process the low complexity video to recognize the class of actions, a second deep CNN comprising multiple fully connected layers is used to process the medium complexity video to recognize the class of actions, and a third deep CNN comprising multiple fully connected layers is used to process the high complexity video to recognize the class of actions;
wherein combining the first, second and third set of probabilities to generate an ensemble set of probabilities comprises:
concatenating the first, second and third set of probabilities; and
generating by a reparameterized fully connected layer the ensemble set of probabilities from the concatenated set of probabilities.

7. The method of claim 1, wherein the threshold is a hyperparameter T based on a budget computational resource, B, wherein the budget computational resource is based on an available computational resource of a group of devices which jointly perform the method, wherein a device is included in the group of devices and its available computational resource is included in the budget computational resource in response to a determination the available computational resource of the respective device is equal to or greater than a computational cost of processing the low complexity video to recognize the class of actions.

8. The method of claim 1, wherein the a first first deep convolutional neural network (CNN) comprising multiple fully connected layers is used to process the low complexity video to recognize the class of actions, a second deep CNN comprising multiple fully connected layers is used to process the medium complexity video to recognize the class of actions, and a third deep CNN comprising multiple fully connected layers is used to process the high complexity video to recognize the class of actions.

9. The method of claim 1, wherein the high complexity video is spatiotemporally decomposed to generate the medium complexity video and low complexity video.

10. The method of claim 9, wherein the spatiotemporally decomposition comprises downsampling the high complexity video to generate the medium complexity video and low complexity video having both a lower resolution video and lower frame rate.

11. The method of claim 9, wherein the downsampling comprises downsizing the high complexity video by a factor of two using a bilinear interpolation technique to generate the medium complexity video, and downsizing the medium complexity video by a factor of two using the bilinear interpolation technique to generate the low complexity video.

12. The method of claim 9, wherein the high complexity video has a resolution of width (W) pixels×height (H) pixels and a frame rate of X in frames per second (FPS), the medium complexity video has a resolution of W/2 pixels×H/2 pixels and a frame rate of X/2 FPS, and the medium complexity video has a resolution of W/4 pixels×H/4 pixels and a frame rate of X/4 FPS.

13. A computing device, comprising:

a processor system comprising at least one processor;

a memory coupled to the processor system, the memory having tangibly stored thereon executable instructions for execution by the processor system, wherein the executable instructions, in response to execution by the processor system, cause the processor system to:

process a high complexity video to generate a medium complexity video and a low complexity video;

process the low complexity video to recognize a class of actions in the low complexity video, wherein a first set of probabilities for the class of actions is output in response to the processing the low complexity video, one probability associated with each action in the class of actions;

process the medium complexity video to recognize the class of actions in the medium complexity video in response to a determination that a highest probability in the first set of probabilities is below a threshold, wherein a second set of probabilities for the class of actions is output in response to the processing the medium complexity video, one probability associated with each action in the class of actions; and process the high complexity video to recognize the class of actions in the high complexity video in response to a determination that a highest probability in the second set of probabilities is below the threshold, wherein a third set of probabilities for the class of actions is output in response to the processing the high complexity video, one probability associated with each action in the class of actions.

14. The computing device of claim 13, wherein the executable instructions, in response to execution by the processor system, cause the processor system to:

output an action having the highest probability in the first set of probabilities in response to a determination that the highest probability in the first set of probabilities is equal to or greater than the threshold;

output an action having the highest probability in the second set of probabilities in response to a determination that the highest probability in the second set of probabilities is equal to or greater than the threshold; and output an action having the highest probability in the third set of probabilities in response to a determination that the highest probability in the third set of probabilities is equal to or greater than the threshold.

15. The computing device of claim 13, wherein the high complexity video is spatiotemporally decomposed to generate the medium complexity video and low complexity video.

16. The computing device of claim 15, wherein a first deep convolutional neural network (CNN) comprising multiple fully connected layers is used to process the low complexity video to recognize the class of actions, a second deep CNN comprising multiple fully connected layers is used to process the medium complexity video to recognize the class of actions, and a third deep CNN comprising multiple fully connected layers is used to process the high complexity video to recognize the class of actions.

17. A non-transitory machine readable medium having tangibly stored thereon executable instructions for execution by a processor system of a computing device, the processor system comprising at least one processor, wherein the executable instructions, in response to execution by the processor system, cause the processor system to:

process a high complexity video to generate a medium complexity video and a low complexity video;

process the low complexity video to recognize a class of actions in the low complexity video, wherein a first set of probabilities for the class of actions is output in response to the processing the low complexity video, one probability associated with each action in the class of actions;

process the medium complexity video to recognize the class of actions in the medium complexity video in response to a determination that a highest probability in the first set of probabilities is below a threshold, wherein a second set of probabilities for the class of actions is output in response to the processing the medium complexity video, one probability associated with each action in the class of actions; and process the high complexity video to recognize the class of actions in the high complexity video in response to a determination that a highest probability in the second set of probabilities is below the threshold, wherein a third set of probabilities for the class of actions is output in response to the processing the high complexity video, one probability associated with each action in the class of actions.

* * * * *